(12) United States Patent
Lezzi et al.

(10) Patent No.: US 9,296,638 B2
(45) Date of Patent: Mar. 29, 2016

(54) THERMALLY TEMPERED GLASS AND METHODS AND APPARATUSES FOR THERMAL TEMPERING OF GLASS

(71) Applicant: Corning Incorporated, Corning, NY (US)

(72) Inventors: Peter Joseph Lezzi, Painted Post, NY (US); Richard Orr Maschmeyer, Corning, NY (US); John Christopher Thomas, Elmira, NY (US); Kevin Lee Wasson, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/814,232

(22) Filed: Jul. 30, 2015

(65) Prior Publication Data

US 2016/0031739 A1   Feb. 4, 2016

Related U.S. Application Data

(60) Provisional application No. 62/031,856, filed on Jul. 31, 2014, provisional application No. 62/074,838, filed on Nov. 4, 2014, provisional application No. 62/147,289, filed on Apr. 14, 2015.

(51) Int. Cl.

| | |
|---|---|
| *C03B 27/048* | (2006.01) |
| *C03B 27/012* | (2006.01) |
| *C03B 27/04* | (2006.01) |
| *C03B 27/044* | (2006.01) |
| *C03C 21/00* | (2006.01) |
| *C03B 35/24* | (2006.01) |
| *C03C 3/11* | (2006.01) |

(Continued)

(52) U.S. Cl.
CPC ........... *C03B 27/0404* (2013.01); *C03B 27/012* (2013.01); *C03B 27/04* (2013.01); *C03B 27/044* (2013.01); *C03B 27/048* (2013.01); *C03B 27/0413* (2013.01); *C03B 27/052* (2013.01); *C03B 29/12* (2013.01); *C03B 29/16* (2013.01); *C03B 35/24* (2013.01); *C03C 3/11* (2013.01); *C03C 21/002* (2013.01)

(58) Field of Classification Search
None
See application file for complete search history.

(56) References Cited

U.S. PATENT DOCUMENTS

| 2,145,119 A | 1/1939 | Littleton |
| 2,177,336 A | 10/1939 | Shaver et al. |

(Continued)

FOREIGN PATENT DOCUMENTS

| AU | 4265772 A | 11/1973 |
| AU | 524573 B2 | 9/1982 |

(Continued)

OTHER PUBLICATIONS

Shelby, "Introduction to Glass Science and Technology", The Royal Chemical Society, 2nd Edition, 2005, p. 193.*

(Continued)

*Primary Examiner* — Lisa Herring
(74) *Attorney, Agent, or Firm* — Gregory V. Bean

(57) ABSTRACT

A strengthened glass sheet product as well as process and an apparatus for making the product. The process comprises cooling the glass sheet by non-contact thermal conduction for sufficiently long to fix a surface compression and central tension of the sheet. The process results in thermally strengthened glass sheets having improved breakage properties.

12 Claims, 16 Drawing Sheets

(51) Int. Cl.
  *C03B 27/052* (2006.01)
  *C03B 29/12* (2006.01)
  *C03B 29/16* (2006.01)

(56) References Cited

U.S. PATENT DOCUMENTS

| | | | |
|---|---|---|---|
| 3,107,196 A | 10/1963 | Acloque | |
| 3,169,900 A | 2/1965 | Ermlich | |
| 3,174,839 A | 3/1965 | Long | |
| 3,223,499 A | 12/1965 | Cypher et al. | |
| 3,223,501 A | 12/1965 | Fredley et al. | |
| 3,223,549 A | 12/1965 | Fredley et al. | |
| 3,293,015 A | 12/1966 | Fredley et al. | |
| 3,332,759 A | 7/1967 | McMaster et al. | |
| 3,374,078 A | 3/1968 | Wright | |
| 3,409,422 A | 11/1968 | Gulotta | |
| 3,449,102 A | 6/1969 | Nedelec et al. | |
| 3,497,340 A | 2/1970 | Dennison et al. | |
| 3,558,415 A | 1/1971 | Rieser et al. | |
| 3,679,388 A | 7/1972 | Giddings et al. | |
| 3,776,712 A | 12/1973 | Wilde | |
| 3,793,127 A | 2/1974 | Wartenberg | |
| 3,794,476 A | 2/1974 | Michalik et al. | |
| 3,830,540 A | 8/1974 | Sperry | |
| 3,844,758 A | 10/1974 | Wartenberg | |
| 3,883,339 A | 5/1975 | Michalik et al. | |
| 3,890,128 A | 6/1975 | Melling et al. | |
| 3,902,884 A | 9/1975 | Harrison | |
| 3,929,442 A | 12/1975 | Neely, Jr. | |
| 3,931,438 A | 1/1976 | Beall et al. | |
| 3,973,943 A | 8/1976 | Seymour | |
| 4,081,254 A | 3/1978 | Matsumoto et al. | |
| 4,128,690 A | 12/1978 | Boardman et al. | |
| 4,194,898 A * | 3/1980 | Wright | B01J 8/46 165/104.16 |
| 4,198,226 A | 4/1980 | Wright et al. | |
| 4,198,463 A | 4/1980 | Greenhalgh | |
| 4,204,845 A | 5/1980 | Shields et al. | |
| 4,314,836 A | 2/1982 | Seymour | |
| 4,319,907 A | 3/1982 | Pike | |
| 4,372,774 A | 2/1983 | Cross et al. | |
| 4,400,193 A | 8/1983 | Cross et al. | |
| 4,470,838 A | 9/1984 | McMaster et al. | |
| 4,494,972 A | 1/1985 | Marsh et al. | |
| 4,516,999 A | 5/1985 | Kiefer et al. | |
| 4,744,676 A * | 5/1988 | Lind | F16C 32/0618 384/114 |
| 4,773,926 A | 9/1988 | Letemps et al. | |
| 4,913,720 A | 4/1990 | Gardon et al. | |
| 5,009,694 A | 4/1991 | Nishitani et al. | |
| 5,236,488 A | 8/1993 | Vehmas | |
| 5,626,911 A | 5/1997 | Bertin et al. | |
| 5,931,981 A | 8/1999 | McMaster et al. | |
| 5,938,808 A | 8/1999 | McMaster et al. | |
| 6,053,011 A | 4/2000 | Lisec | |
| 6,094,943 A | 8/2000 | Okuda et al. | |
| 6,295,842 B1 | 10/2001 | McMaster | |
| 6,336,775 B1 | 1/2002 | Morita et al. | |
| 6,353,283 B1 | 3/2002 | Ghosh et al. | |
| 6,412,309 B1 | 7/2002 | Kajii et al. | |
| 6,598,427 B1 | 7/2003 | Douche et al. | |
| 6,826,929 B2 | 12/2004 | Boaz | |
| 6,881,931 B2 | 4/2005 | Vehmas et al. | |
| 7,367,205 B1 | 5/2008 | Boaz | |
| 7,694,532 B1 | 4/2010 | Boaz | |
| 8,074,473 B2 | 12/2011 | Nitschke et al. | |
| 8,234,883 B2 | 8/2012 | Krall, Jr. et al. | |
| 8,769,990 B2 | 7/2014 | Saito et al. | |
| 8,997,521 B2 | 4/2015 | Vehmas et al. | |
| 2003/0177790 A1 | 9/2003 | Langsdorf et al. | |
| 2004/0107733 A1 | 6/2004 | Yashizawa | |
| 2006/0054774 A1 * | 3/2006 | Yassour | B65G 51/03 248/631 |
| 2006/0121281 A1 | 6/2006 | Tamai et al. | |
| 2006/0219605 A1 * | 10/2006 | Devitt | B65G 49/065 209/37 |
| 2007/0122580 A1 * | 5/2007 | Krall, Jr. | C03B 27/02 428/38 |
| 2007/0271957 A1 | 11/2007 | Nakamura et al. | |
| 2009/0220761 A1 | 9/2009 | Dejneka et al. | |
| 2011/0123833 A1 | 5/2011 | Endo et al. | |
| 2011/0281093 A1 | 11/2011 | Gulati et al. | |
| 2011/0289971 A1 | 12/2011 | Brown et al. | |
| 2012/0144867 A1 | 6/2012 | Busch | |
| 2013/0008500 A1 | 1/2013 | Lin et al. | |
| 2013/0047673 A1 | 2/2013 | Lee et al. | |
| 2013/0122284 A1 | 5/2013 | Gross | |
| 2013/0122313 A1 | 5/2013 | Gross | |
| 2013/0255314 A1 * | 10/2013 | Allan | C03C 21/00 65/30.14 |
| 2014/0026622 A1 | 1/2014 | Wang | |
| 2014/0050912 A1 | 2/2014 | Isono et al. | |
| 2014/0053605 A1 | 2/2014 | Mader | |
| 2014/0242391 A1 | 8/2014 | Ono et al. | |
| 2015/0052949 A1 | 2/2015 | Bayne et al. | |
| 2015/0083200 A1 | 3/2015 | Hickman et al. | |
| 2015/0096331 A1 | 4/2015 | Rantala et al. | |

FOREIGN PATENT DOCUMENTS

| | | |
|---|---|---|
| AU | 535129 B2 | 3/1984 |
| CA | 1148742 A1 | 6/1983 |
| CA | 1176468 A1 | 10/1984 |
| CA | 2171323 C | 1/1996 |
| CN | 1208266 C | 6/2005 |
| CN | 1896020 B | 6/2011 |
| CN | 102149649 A | 8/2011 |
| CN | 102659305 A | 9/2012 |
| CN | 101774751 B | 1/2013 |
| CN | 101312919 B | 4/2013 |
| CN | 103253857 A | 8/2013 |
| CN | 103319082 A | 9/2013 |
| CN | 103359934 A | 10/2013 |
| CN | 103781733 A | 5/2014 |
| CN | 103827051 A | 5/2014 |
| CN | 104310773 A | 1/2015 |
| CN | 104355530 A | 2/2015 |
| CN | 104583141 A | 4/2015 |
| DE | 2233057 A1 | 3/1973 |
| EP | 0173418 A2 | 3/1986 |
| EP | 0882681 A1 | 12/1998 |
| EP | 1414762 A1 | 5/2004 |
| EP | 1925952 A1 | 5/2008 |
| EP | 1245545 B1 | 8/2011 |
| EP | 1380550 B1 | 9/2011 |
| EP | 1215039 B1 | 6/2012 |
| EP | 2543644 A2 | 1/2013 |
| EP | 2853517 A1 | 4/2015 |
| FR | 2326386 A1 | 4/1977 |
| GB | 996423 A | 6/1965 |
| GB | 1112781 A | 5/1968 |
| GB | 1160284 A | 8/1969 |
| GB | 1253681 A | 11/1971 |
| GB | 1282720 A | 7/1972 |
| GB | 1289488 A | 9/1972 |
| GB | 2232978 A | 1/1991 |
| IN | 202420 B | 5/2005 |
| IN | 200301606 P2 | 4/2006 |
| IN | 264254 B | 8/2008 |
| IN | 200803022 P1 | 8/2008 |
| JP | 4642107 * | 12/1971 |
| JP | 51-103920 A | 9/1976 |
| JP | 51103920 * | 9/1976 |
| JP | S51103920 A | 9/1976 |
| JP | S56155030 A | 12/1981 |
| JP | S56155031 A | 12/1981 |
| JP | S5767035 A | 4/1982 |
| JP | S5767036 A | 4/1982 |
| JP | S5888132 A | 5/1983 |
| JP | S5891042 A | 5/1983 |
| JP | S598626 A | 1/1984 |
| JP | S598627 A | 1/1984 |
| JP | S598628 A | 1/1984 |

(56) References Cited

FOREIGN PATENT DOCUMENTS

| | | |
|---|---|---|
| JP | S598629 A | 1/1984 |
| JP | S598630 A | 1/1984 |
| JP | S598631 A | 1/1984 |
| JP | S5957923 A | 4/1984 |
| JP | S60171245 A | 9/1985 |
| JP | S6172637 A | 4/1986 |
| JP | S6236030 A | 2/1987 |
| JP | S63270330 A | 11/1988 |
| JP | H02175624 A | 7/1990 |
| JP | H02102436 U | 8/1990 |
| JP | H0345526 A | 2/1991 |
| JP | H03271127 A | 12/1991 |
| JP | H0789739 A | 4/1995 |
| JP | H07157322 A | 6/1995 |
| JP | H07267664 A | 10/1995 |
| JP | H11199257 A | 7/1999 |
| JP | 2000072463 A | 3/2000 |
| JP | 2000103632 A | 4/2000 |
| JP | 2000172202 A | 6/2000 |
| JP | 2000327355 A | 11/2000 |
| JP | 2001002434 A | 1/2001 |
| JP | 2001307662 A | 11/2001 |
| JP | 2003040635 A | 2/2003 |
| JP | 2003137603 A | 5/2003 |
| JP | 2003261344 A | 9/2003 |
| JP | 2003342030 A | 12/2003 |
| JP | 2004091311 A | 3/2004 |
| JP | 4397196 B2 | 1/2010 |
| JP | 4438126 B2 | 3/2010 |
| JP | 4557606 B2 | 10/2010 |
| JP | 4722371 B2 | 7/2011 |
| JP | 4951838 B2 | 6/2012 |
| JP | 5334005 B2 | 11/2013 |
| JP | 5714701 B2 | 5/2015 |
| JP | 2015086080 A | 5/2015 |
| KR | 100218143 B1 | 9/1999 |
| KR | 20020061567 A | 7/2002 |
| KR | 100690381 B1 | 2/2007 |
| KR | 100918577 B1 | 9/2009 |
| KR | 100937889 B1 | 1/2010 |
| KR | 101000677 B1 | 12/2010 |
| KR | 101032825 B1 | 5/2011 |
| KR | 20110087774 A | 8/2011 |
| KR | 20110106629 A | 9/2011 |
| KR | 20110112503 A | 10/2011 |
| KR | 101093947 B1 | 12/2011 |
| KR | 101120262 B1 | 3/2012 |
| KR | 20120051220 A | 5/2012 |
| KR | 20120070450 A | 6/2012 |
| KR | 101248380 B1 | 3/2013 |
| KR | 101286131 B1 | 7/2013 |
| KR | 101413626 B1 | 8/2014 |
| KR | 20140110364 A | 9/2014 |
| KR | 2014135846 A | 11/2014 |
| RU | 2151750 C1 | 6/2000 |
| RU | 2199496 C2 | 2/2003 |
| RU | 2237621 C1 | 10/2004 |
| RU | 2299184 C1 | 5/2007 |
| RU | 2464243 C1 | 10/2012 |
| RU | 254731 C | 3/2013 |
| SU | 95854 A1 | 11/1952 |
| SU | 443845 A1 | 9/1974 |
| SU | 537960 A1 | 12/1976 |
| SU | 631464 A1 | 11/1978 |
| SU | 556593 A1 | 8/1982 |
| SU | 548188 A1 | 9/1982 |
| SU | 1098916 A1 | 6/1984 |
| SU | 1150234 A1 | 4/1985 |
| SU | 1655920 A1 | 6/1991 |
| WO | 9003337 A1 | 4/1990 |
| WO | 9944952 A1 | 9/1999 |
| WO | 0116040 A1 | 3/2001 |
| WO | 0216277 A1 | 2/2002 |
| WO | 03014035 A1 | 2/2003 |
| WO | 2006083902 A1 | 8/2006 |
| WO | 2006110145 A1 | 10/2006 |
| WO | 2008020509 A1 | 2/2008 |
| WO | 2008147558 A1 | 12/2008 |
| WO | 2012082709 A1 | 6/2012 |
| WO | 2012142629 A1 | 10/2012 |
| WO | 2014030682 A1 | 2/2014 |
| WO | 2014182776 A9 | 11/2014 |
| WO | 2015033562 A1 | 3/2015 |

OTHER PUBLICATIONS

Co-pending U.S. Appl. No. 14/814,293, filed Jul. 30, 2015.
Co-pending U.S. Appl. No. 14/814,319, filed Jul. 30, 2015.
Co-pending U.S. Appl. No. 14/814,181, filed Jul. 30, 2015.
Co-pending U.S. Appl. No. 14/814,303, filed Jul. 30, 2015.
Co-pending U.S. Appl. No. 14/814,335, filed Jul. 30, 2015.
Co-pending U.S. Appl. No. 14/814,274, filed Jul. 30, 2015.
Co-pending U.S. Appl. No. 14/814,363, filed Jul. 30, 2015.
Lee, Hoikwan et al., "Glass Thickness and Fragmentation Behavior in Stressed Glasses," New Journal of Glass and Ceramics, vol. 2, 2012, pp. 138-143.
Lezzi, P. J. et al., "Confirmation of thin surface residual compressive stress in silica glass fiber by FTIR reflection spectroscopy," Journal of Non-Crystalline Solids, vol. 390, 2014, pp. 13-18.
Li, Hong et al., "Effect of Fictive Temperature on Dynamic Fatigue Behavior of Silica and Soda-Lime Glasses," Journal of the American Ceramic Society, vol. 78, No. 5, 1995, pp. 1393-1396.
Loucks, Dr. Roger, "Lecture 13: The Fictive and Glass Transition Temperatures," IMI-NFG's MITT Course on Relaxation Processes in Glass Lecture 13, Mar. 2, 2010, 25 slides.
Loucks, Dr. Roger, "Lecture 14: Relaxation and the Tool-Narayanaswamy-Moynihan Equation," IMI-NFG's MITT Course on Relaxation Processes in Glass Lecture 14, Mar. 4, 2010, 27 slides.
Loucks, Dr. Roger, "Lecture 15: The Tool-Narayanaswamy-Moynihan Equation Part II and DSC," IMI-NFG's MITT Course on Relaxation Processes in Glass Lecture 15, Mar. 9, 2010, 33 slides.
Loucks, Dr. Roger, "Lecture 16: The Tool-Narayanaswamy-Moynihan Equation Part II and DSC," IMI-NFG's MITT Course on Relaxation Processes in Glass Lecture 16, Mar. 11, 2010, 32 slides.
Markovsky, Alex et al., "An Efficient and Stable Algorithm for Calculating Fictive Temperatures," Communications of the American Ceramic Society, Apr. 1984, 2 pages.
Martin, Dr. Steve, "Lecture 10: Thermodynamic Functions," IMI-NFG's MITT Course on Relaxation Processes in Glass Lecture 10, 2010, 25 slides.
Martin, Dr. Steve, "Lecture 12: The Glass Transition as a Kinetic Transition," IMI-NFG's MITT Course on Relaxation Processes in Glass Lecture 12, 2010, 21 slides.
Martin, Dr. Steve, "Lecture 9: Thermodynamic Concepts and the Law of Thermodynamics," IMI-NFG's MITT Course on Relaxation Processes in Glass Lecture 9, 2010, 32 slides.
Massen, Claire P. et al., "Power-law distributions for the areas of the basins of attraction on a potential energy landscape," Physical Review E, The American Physical Society, vol. 75, 2007, 4 pages.
Mauricio-Iglesias, M. et al., "Raman depth-profiling characterization of a migrant diffusion in a polymer," Journal of Membrane Science, vol. 375, 2011, pp. 165-171.
McGlinchy, Timothy B., "Energy Efficient Tripe IG Automation EEE (Triple-E)," DE-EE0000167, GED Integrated Solutions, Feb. 28, 2013, 45 pages.
McMaster, Ronald A. et al., "Annealed and Tempered Glass," Engineered Materials Handbook, vol. 4, Ceramics and Glasses, 1991, 9 pages.
McMaster, Ronald A., "Flat Glass Tempering—How It Works," Glass Industry, Jun. 1989, pp. 10-15.
McMaster, Ronald A., "Fundamentals of Tempered Glass," Proceedings of the 49th Conference on Glass Problems: Ceramic Engineering and Science Proceedings, vol. 10, Issue 3/4, 1989, pp. 193-206.
Mikowski, A. et al., "Statistical analysis of threshold load for radial crack nucleation by Vickers indentation in commercial soda-lime silica glass," Journal of Non-Crystalline Solids, vol. 352, 2006, pp. 3544-3549.

(56) References Cited

OTHER PUBLICATIONS

Mognato, Ennio et al., "Thermally toughened safety glass," Glass on Web, Last Reviewed: Jul. 2011, 9 pages, http://www.glassonweb.com/articles/article/727/.

Moynihan, C. T. et al., "Structural Relaxation in Vitreous Materials," Annals of the New York Academic of Sciences, vol. 279, Oct. 1976, pp. 15-35.

Narayanaswamy, O. S. et al., "Calculation of Residual Stresses in Glass," Journal of the American Ceramic Society, vol. 52, No. 10, Oct. 1969, pp. 554-558.

Narayanaswamy, O. S., "Stress and Structural Relaxation in Tempering Glass," Journal of the American Ceramic Society, vol. 61, No. 3-4, Mar.-Apr. 1978, pp. 146-152.

Oakley, David R., "Crack branching in float glass subjected to biaxial loading," Journal of Non-Crystalline Solids, vol. 196, 1996, pp. 139-143.

Ohlberg, S.M. et al., "Thermal Stress Calculations Based on a Linear Viscoelastic Deviatoric Response and a Fictive Temperature Component for the Volumetric Response," Journal of Non-Crystalline Solids, vol. 14, 1974, pp. 280-286.

Paschel, Richard, "History of the Safety Glazing Certification Council," Safety Glazing Certification Council, Date Unknown, 11 pages.

Ray, N. H. et al., "Increasing the strength of glass by treatment in molten salts," Physics and Chemistry of Glasses, vol. 8, No. 1, Feb. 1967, pp. 30-34.

Rekhson, S. M., "Chapter 1: Viscoelasticity of Glass," In "Glass: Science and Technology," vol. 3, 1986, 117 pages.

Rekson, S. M., "Structural Relaxation and Shear Stresses in the Glass-Transition Region," Soviet Journal of Glass Physics and Chemistry, 1975, pp. 417-421.

Sastry, Srikanth, "The relationship between fragility, configurational entropy and the potential energy landscape of glass-forming liquids," Nature, vol. 409, Jan. 11, 2001, pp. 164-167.

Scherer, George W., "Use of the Adam-Gibbs Equation in the Analysis of Structural Relaxation," Journal of the American Ceramic Society, vol. 67, No. 7, Jul. 1984, pp. 504-511.

Sciortino, Francesco, "Potential energy landscape description of supercooled liquids and glasses," Journal of Statistical Mechanics: Theory and Experiment, May 31, 2005, 35 pages.

Sehgal, Jeetendra et al., "A New Low-Brittleness Glass in the Soda-Lime-Silica Glass Family," Journal of the American Ceramic Society, vol. 81, No. 9, Sep. 1998, pp. 2485-2488.

Setsuro, Ito et al., "Processing Technical Books to the Glass High-Functions," Chapter 3: Sections 2.5, 3, 3.1, 3.2 & 3.3, Science & Technology Co., Ltd., Sep. 27, 2012, pp. 58-65.

Shimodaira, N. et al., "Raman spectra of fluorine-doped silica glasses with various fictive temperatures," Journal of Applied Physics, vol. 91, No. 6, Mar. 15, 2002, pp. 3522-3525.

Shinkai, Norihiko et al., "Indentation Fracture of Tempered Glasses," Reports of the Research Laboratory, Asahi Glass Co., Ltd., vol. 23, No. 2, 1973, pp. 83-99.

Shouyuan, Zhai et al., "Influence of Temperature and Time on Glass Strength During Chemical Tempering," Journal of Shangdong Institute of Light Industry (Natural Science Edition), Feb. 1996, 3 pages.

Shutov, A. I. et al., "Prediction of the Character of Tempered Glass Fracture," Glass and Ceramics, vol. 55, Nos. 1-2, 1998, pp. 8-10.

Soules, Thomas F. et al., "Finite-Element Calculation of Stresses in Glass Parts Undergoing Viscous Relaxation," Journal of the American Ceramic Society, vol. 70, No. 2, Feb. 1987, pp. 90-95.

Southard, J. C., "The Thermal Properties of Crystalline and Glassy Boron Trioxide," Journal of the American Chemical Society, vol. 63, No. 11, Nov. 1941, pp. 3147-3150.

Spaght, Monroe E. et al., "Studies on Glass. VIII. The Coefficient of Thermal Expansion of Boron Trioxide," Journal of Physical Chemistry, vol. 38, No. 1, 1934, pp. 103-110.

Stillinger, Frank H. et al., "Packing Structures and Transitions in Liquids and Solids," Science, New Series, vol. 225, No. 4666, Sep. 7, 1984, pp. 983-989.

Stillinger, Frank H., "A Topographic View of Supercooled Liquids and Glass Formation," Science, New Series, vol. 267, No. 5206, Mar. 31, 1995, pp. 1935-1939.

Tallant, D. R. et al., "The Effects of Tensile Stress on the Raman Spectrum of the Silica Glass," Journal of Non-Crystalline Solids, vol. 106, 1988, pp. 380-383.

Tandon, Rajan et al., "Controlling the Fragmentation Behavior of Stressed Glass," Fracture Mechanics of Ceramics, vol. 14, 2005, pp. 77.

Varughese, Binoy et al., "Effect of fictive temperature on mechanical strength of soda-lime glasses," Journal of Non-Crystalline Solids, vol. 241, 1998, pp. 134-139.

Walrafen, G. E. et al., "Raman investigation of optical fibers under high tensile stress," Journal of Applied Physics, vol. 52, No. 4, Apr. 1981, pp. 2832-2836.

Wang, Fei et al., "Pressure Raman effects and internal stress in network glasses," Physical Review B, vol. 71, 2005, 32 pages.

Yamane, Masayuki, "Chapter 3: Thermal Processing," Glass Engineering Handbook, Asakura Publishing Co. Ltd., Jul. 1999, pp. 410-417.

Yue, Y.Z. et al., "Determination of the fictive temperature for a hyperquenched glass," Chemical Physics Letters, vol. 357, Issues 1-2, May 3, 2002, pp. 20-24.

Zaman, F. D. et al., "Cooling of a Plate with General Boundary Conditions," International Journal of Mathematics and Mathematical Sciences, vol. 23, No. 7, 2000, pp. 477-485.

Donald, I. W., "Review: Methods for improving the mechanical properties of oxide glasses," Journal of Materials Science, vol. 24, 1989, pp. 4177-4208.

Ernsberger, F. M., "Chapter 1: Elastic Properties of Glasses," In "Glass: Science and Technology," vol. 5, Elasticity and Strength in Glasses, Academic Press, Inc., May 28, 1980, pp. 1-19.

Ernsberger, F. M., "Chapter 4: Techniques of Strengthening Glasses," In "Glass: Science and Technology," vol. 5, Elasticity and Strength in Glasses, Academic Press, Inc., May 28, 1980, pp. 133-144.

Everall, Neil et al., "Optimizing Depth Resolution in Confocal Raman Microscopy: A Comparison of Metallurgical, Dry Corrected, and Oil Immersion Objectives," Applied Sprectroscopy, vol. 61, No. 3, 2007, pp. 251-259.

Everall, Neil J., "Confocal Raman Microscopy: Why the Depth Resolution and Spatial Accuracy Can Be Much Worse then You Think," Applied Spectroscopy, vol. 54, No. 10, 2000, pp. 1515-1520.

Fajans, Kasimir et al., "Properties and Structures of Vitreous and Crystalline Boron Oxide," Journal of the American Chemical Society, vol. 74, No. 11, Jun. 5, 1952, pp. 2761-2768.

Fotheringham, Dr. Ulrich, "Lecture 1: Internet teaching set-up," IMI-NFG's MITT Course on Relaxation Processes in Glass and Polymers Lecture 1, 2010, 6 slides.

Fotheringham, Dr. Ulrich, "Lecture 2: Phenomenology of viscoelasticity & glass transition," IMI-NFG's MITT Course on Relaxation Processes in Glass and Polymers Lecture 2, 2010, 17 slides.

Fotheringham, Dr. Ulrich, "Lecture 5: Viscoelasticity I—Shear," IMI-NFG's MITT Course on Relaxation Processes in Glass and Polymers Lecture 5, 2010, 19 slides.

Fotheringham, Dr. Ulrich, "Lecture 6: Viscoelasticity II—Bulk Viscoelasticity," IMI-NFG's MITT Course on Relaxation Processes in Glass and Polymers Lecture 6, 2010, 16 slides.

Fotheringham, Dr. Ulrich, "Lecture 7: Viscoelasticity III—Dynamic Testing," IMI-NFG's MITT Course on Relaxation Processes in Glass and Polymers Lecture 7, 2010, 19 slides.

Fotheringham, Dr. Ulrich, "Lecture 8: Viscoelasticity IV—Important Application of Pre-Stressing," IMI-NFG's MITT Course on Relaxation Processes in Glass and Polymers Lecture 8, 2010, 12 slides.

Freiman, S. W., "Chapter 2: Fracture Mechanics of Glass," In "Glass: Science and Technology," vol. 5, Elasticity and Strength in Glasses, Academic Press, Inc., May 28, 1980, pp. 21-78.

Frick, B. et al., "The Microscopic Basis of the Glass Transition in Polymers from Neutron Scattering Studies," Science, vol. 267, Mar. 31, 1995, pp. 1939-1945.

Galeener, Frank L., "Raman and ESR Studies of the Thermal History of Amorphous $SiO_2$," Journal of Non-Crystalline Solids, vol. 71, 1985, pp. 373-386.

(56) References Cited

OTHER PUBLICATIONS

Gang, Zhang Ming, "Manufacturing and Properties of Glass Used in Construction," Guangdong Golden Glass Technologies Ltd, Dec. 27, 2002, 11 pages.
Gardon, Robert, "Calculation of Temperature Distributions in Glass Plates Undergoing Heat-Treatment," Journal of the American Ceramic Society, vol. 41, No. 6, Jun. 1958, pp. 200-209.
Gardon, Robert, "Chapter 5: Thermal Tempering of Glass," In "Glass: Science and Technology," vol. 5, Elasticity and Strength in Glasses, Academic Press, Inc., May 28, 1980, pp. 145-216.
Gardon, Robert, "Tempering Glass with Modulated Cooling Schedules," Journal of the American Ceramic Society, vol. 71, No. 10, Oct. 1988, pp. 876-878.
Gardon, Robert, "Variation of Densities and Refractive Indices in Tempered Glass," Journal of the American Ceramic Society, vol. 61, No. 3-4, Mar.-Apr. 1978, pp. 143-146.
Glass, Jill et al., "Processing and Properties of Ion Exchanged Glasses," Glass and Optical Materials Division Fall Meeting, Nov. 6-12, 2004, Cape Canaveral, FL, 33 slides.
Glass, S. J. et al., "Stressed Glass Technology for Actuators and Removable Barrier Applications," Sandia Report SAND2007-4106, Sandia National Laboratories, Jul. 2007, 18 pages.
Gomez, Sinue et al., "69.2: Designing Strong Glass for Mobile Devices," SID Symposium Digest of Technical Papers, vol. 40, No. 1, Jan. 2009, pp. 1045-1048.
Gross, T.M., "Deformation and cracking behavior of glasses indented with diamond tips of various sharpness," Journal of Non-Crystalline Solids, vol. 358, Issue 24, Dec. 12, 2012, pp. 3445-3452.
Guillemet, C., "Annealing and Tempering of Glass," Journal of Non-Crystalline Solids, vol. 123, 1990, pp. 415-426.
Gulati, Suresh T., "Frangibility of Tempered Soda-Lime Glass Sheet," Glass Processing Days, Sep. 13-15, 1997, pp. 72-76.
Martin, Dr. Steve, "Lecture 11: Thermodynamics in the Glass Transition Region," IMI-NFG's MITT Course on Relaxation Processes in Glass Lecture 11, 2010, 22 slides.
Gupta, Prabhat K. et al., "The laboratory glass transition," The Journal of Chemical Physics, vol. 126, 2007, 9 pages.
Gupta, Prabhat, "Landscape Approach to Glass Transition and Relaxation: Basic Concepts (contd.)," IMI-NFG's MITT Course on Relaxation Processes in Glass Lecture 18, Mar. 25, 2010, 23 slides.
Gupta, Prabhat, "Landscape Approach to Glass Transition and Relaxation: Four lectures on 'The Landscape Approach,'" IMI-NFG's MITT Course on Relaxation Processes in Glass Lecture 17, Mar. 23, 2010, 28 slides.
Gupta, Prabhat, "Landscape Approach to Glass Transition and Relaxation: Liquid to Glass Transition," IMI-NFG's MITT Course on Relaxation Processes in Glass Lecture 19, Mar. 30, 2010, 25 slides.
Gupta, Prabhat, "Landscape Approach to Glass Transition and Relaxation: Relaxation in the glassy state," IMI-NFG's MITT Course on Relaxation Processes in Glass Lecture 20, Apr. 1, 2010, 20 slides.
Gy, René, "Ion exchange for glass strengthening," Materials Science and Engineering B, vol. 149, 2008, pp. 159-165.
Hara, Morihisa et al., "Vickers Hardness of Toughened Sheet Glass," Reports of the Research Laboratory, Asahi Glass Co., Ltd., vol. 12, No. 2, 1962, pp. 99-104.
Hibino, Yoshinori et al., "Raman study on silica optical fibers subjected to high tensile stress," Applied Physics Letters, vol. 47, No. 8, Oct. 15, 1985, pp. 812-814.
Hodge, Ian M., "Physical Aging in Polymer Glasses," Science, vol. 267, , No. 5206, Mar. 31, 1995, pp. 1945-1947.
Huang, Liping et al., "Polyamorphic transitions in vitreous $B_2O_3$, under pressure," Journal of Physics: Condensed Matter, vol. 20, 2008, 8 pages.
Hubert, Mathieu, "Lecture 9: Annealing and tempering," IMI-NFG Course on Processing in Glass—Lecture 9, Feb. 19, 2015, 72 slides.
Ito, Setsuro, "Brittleness and Nano-Structure of Glass," 4th International Workshop on Flow and Fracture of Advanced Glasses Presentation, Nov. 5-7, 2007, Shiga, Japan, 37 slides.
Jain, Himanshu, "Electrical Relaxation—Topic 1: Quasi-free ion transport," IMI-NFG's MITT Course on Relaxation Processes in Glass Lecture 23, Advanced Vitreous State, The Properties of Glass: Dielectric Properties—Lecture 1, 2010, 28 slides.
Jain, Himanshu, "Electrical Relaxation—Topic 2: Universal dielectric response (UDR)," IMI-NFG's MITT Course on Relaxation Processes in Glass Lecture 24, Advanced Vitreous State, The Properties of Glass: Dielectric Properties—Lecture 1, 2010, 22 slides.
Jain, Himanshu, "Electrical Relaxation—Topic 3: Nearly constant loss—second universality," IMI-NFG's MITT Course on Relaxation Processes in Glass Lecture 25, Advanced Vitreous State, The Properties of Glass: Dielectric Properties—Lecture 3, 2010, 24 slides.
Karlsson, Stefan et al., "The technology of chemical glass strengthening—a review," Glass Technology, European Journal of Glass Science Technology Part A, vol. 51, No. 2, Apr. 2010, pp. 41-54.
Kassir-Bodon, Assia et al., "Raman Mapping of the Indentation-Induced Densification of a Soda-Lime-Silicate Glass," International Journal of Applied Glass Science, vol. 3, No. 1, 2012, pp. 29-35.
Kiefer, Werner et al., "Method for Thermal Prestressing of Glass," Strength of Inorganic Glass, Plenum Press, New York, 1985, pp. 501-511.
Kishii, Toru, "Surface Stress Meters Utilising the Optical Waveguide Effect of Chemically Tempered Glasses," Optics and Lasers in Engineering, vol. 4, 1983, pp. 25-38.
Kistler, S. S., "Stresses in Glass Produced by Nonuniform Exchange of Monovalent Ions," Journal of the American Ceramic Society, vol. 45, No. 2, Feb. 1962, pp. 59-68.
Koike, A. et al., "Fictive temperature dependence of subcritical crack growth rate of normal glass and anomalous glass," Journal of Non-Crystalline Solids, vol. 352, 2006, pp. 5522-5530.
Kong, Jinhak et al., "Residual Stress Analysis with Improved Numerical Methods for Tempered Plate Glasses Based on Structural Relaxation Model," Metals and Materials International, vol. 13, No. 1, 2007, pp. 67-75.
Lathabai, Srinivasarao et al., "Fracture mechanics model for sub-threshold indentation flaws: Part 1—Equilibrium fracture," Journal of Materials Science, vol. 26, 1991, pp. 2157-2168.
Aben, H. et al., "2.7 Stresses Due to Heterogeneities," Photoelasticity of Glass, Springer-Verlag, New York, 1993, p. 46.
Acloque, P., "Influence of Strain-Systems in Glass upon the Course of its Fracture," Proceedings of the 4th International Glass Congress, vol. 6, 1965, pp. 279-291.
Acloque, Paul, "Comparison Between Heat-Transfer Conditions and Setting Up of Strain in Glass During Heat-Treatment," Journal of the American Ceramic Society, vol. 44, No. 7, Jul. 1961, pp. 364-373.
Agarwal, Anand et al., "A simple IR spectroscopic method for determining fictive temperature of silica glasses," Journal of Non-Crystalline Solids, vol. 185, 1995, pp. 191-198.
Agarwal, Anand et al., "Determination of Fictive Temperature of Soda-Lime Silicate Glass," Journal of the American Ceramic Society, vol. 78, No. 3, Mar. 1995, pp. 827-829.
Akeyoshi, K. et al., "Mechanical Properties of Tempered Glass," Proceedings of the 7th International Glass Congress, vol. 14, 1965, pp. 80-85.
Alexiades, V. et al., "The New WaylGlaston Problem," 28th Annual Workshop on Mathematical Problems in Industry, University of Delaware, Jun. 2012, 30 slides.
Argon, A. S., "Chapter 3: Inelastic Deformation and Fracture in Oxide, Metallic, and Polymeric Glasses," In, "Glass: Science and Technology," vol. 5, Elasticity and Strength in Glass, Academic Press, May 28, 1980, pp. 79-132.
Aronen, Antti et al., "Tempering of Thin Glass," Glasstec 2012: Engineered Transparency, Oct. 25-26, 2012, pp. 145-153.
Author Unknown, "Application Note AN 527: Depth profiling of complex samples using confocal Raman microscopy," Bruker Optics Inc., 2012, 3 pages.
Author Unknown, "Architectural ERH2™," Architectural Glass Systems, Glasstech, Inc., 2011, 2 pages.
Author Unknown, "Architectural FCH2™," Architectural Glass Systems, Glasstech, Inc., 2011, 2 pages.
Author Unknown, "Corning® Gorilla™ Glass," Corning Incorporated, 2009, 2 pages.
Author Unknown, "Glass Strengthening Methods," Abrisa Technologies, Apr. 2015, 2 pages.

(56) References Cited

OTHER PUBLICATIONS

Author Unknown, "Heat Treated Glass for Architectural Glazing," Glass Technical Document: TD-138, PPG Glass Technology, PPG Industries, Inc., Nov. 2011, 8 pages.
Author Unknown, "Introducing—Glasstech CRB-S™ 1900 for Solar Parabolic Shapes," Solar Glass Systems, Glasstech, Inc., Date Unknown, 1 page.
Author Unknown, "New Way Air Bearings," 28th Annual Workshop on Mathematical Problems in Industry, University of Delaware, Jun. 2012, 16 slides.
Author Unknown, "Products, Glazing Techniques and Maintenance Section 4: GGF Datasheet for the Quality of Thermally Toughened Soda Lime Silicate Safety Glass for Building," Glass and Glazing Federation, Aug. 2009, 12 pages.
Author Unknown, "Schott Technical Glasses—Physical and technical properties," Schott North America, Inc., Feb. 2010, 44 pages.
Author Unknown, "scratch and dig numbers," Sizes, Inc., Last Revised: Jun. 24, 2010, 5 pages, http://www.sizes.com/units/scratch_and_dig.htm.
Author Unknown, "Solar FCH-S™," Solar Glass Systems, Glasstech, Inc., 2011, 2 pages.
Author Unknown, "Standard Specification for Heat-Strengthened and Fully Tempered Flat Glass," Designation: C 1048-12, ASTM International Standard, 2015, 7 pages.
Author Unknown, "Standard Specification for Heat-Treated Flat Glass—Kind HS, Kind FT Coated and Uncoated Glass," Designation: C 1048-4, ASTM International Standard, 2009, 7 pages.
Author Unknown, "Subject Index," Date Unknown, pp. 277-282.
Author Unknown, "Tempered Glass," Tecnoglass, www.tecnoglass.com/tempered.pdf, Date Unknown, 5 pages.
Author Unknown, "Thermal Tempering," EuropTec GmbH, Nov. 6, 2014, 2 pages.
Author Unknown, "Unsteady Heat Transfer—HT3: Experimental Studies of Thermal Diffusivities and Heat Transfer Coefficients," Date Unknown, 27 slides.
Ayinder, C.C. et al., "Thermal-Tempering Analysis of Bulk Metallic Glass Plates Using an Instant-Freezing Model," Metallurgical and Materials Transactions A, vol. 32A, Nov. 2001, pp. 2709-2715.
Baldwin, K. J. et al., "Confocal Raman Microspectroscopy through a Planar Interface," Applied Spectroscopy, vol. 55, No. 5, 2001, pp. 517-524.
Barr, J. W., "Glass Tempering by Numbers," Aug. 2008, 8 pages.
Barr, Jonathan W., "The Tempering Process," Cardinal Waxachachie Tempering Seminar, Mar. 26, 2008, 36 slides.
Barr, Jonathan, "The Glass Tempering Handbook—Understanding the Glass Tempering Process," Self Published, 2015, 52 pages, http://www.lambertgtservices.co.uk/book/TheGlassTemperingHandbook.pdf.
Barsom, John M., "Fracture of Tempered Glass," Journal of the American Ceramic Society, vol. 51, No. 2, Feb. 1968, pp. 75-78.
Bartholomew, Roger F. et al., "Chapter 6: Chemical Strengthening of Glass," In "Glass: Science and Technology," vol. 5, Elasticity and Strength in Glass, Academic Press, May 28, 1980, pp. 217-270.
Beauchamp, Edwin K. et al., "Dynamics of Window Glass Fracture in Explosions," Sandia Report SAND98-0598 UC-700, Sandia National Laboratories, May 1998, 74 pages.
Boaz, Prem, "Tempering Very Thin Glass—What Radio Waves Mean for the Glass Industry," USGlass Magazine, vol. 45, Issue 3, Mar. 2010, 5 pages.
Boaz, Prem, "Thin glass processing with radio wave assist," Glass on Web, Last Reviewed: Jan. 2013, 6 pages, http://www.glassonweb.com/articles/article/561/.
Boguslavskii, I. A., "Studying the Nature of the Super-Strength of Glasses Strengthened by the Thermophysical Method," Glass and Ceramics, vol. 21, No. 10, Oct. 1964, pp. 562-567.
Brown, Angus M., "Nonlinear regression analysis of data using a spreadsheet," Application Note, ISC, Oct. 2001, pp. 58-59.
Conradt, Reinhard, "I. Fragility and its Relation to Other Glass Properties," IMI-NFG's MITT Course on Relaxation Processes in Glass Lecture 21, Apr. 6-8, 2010, 61 slides.
Conradt, Reinhard, "II. Networks," IIMI-NFG's MITT Course on Relaxation Processes in Glass Lecture 22, Apr. 6-8, 2010, 61 slides.
Conway, Jr., Joseph C. et al., "Use of Crack Branching Data for Measuring Near-Surface Residual Stresses in Tempered Glass," Journal of the American Ceramic Society, vol. 72, No. 9, Sep. 1989, pp. 1584-1587.
Cox, Dr. Chris, "Lecture 3: Complex exponential function, Fourier and Laplace transforms," IMI-NFG's MITT Course on Relaxation Processes in Glass and Polymers Lecture 3, 2010, 25 slides.
Cox, Dr. Chris, "Lecture 4: Differential Equations," IMI-NFG's MITT Course on Relaxation Processes in Glass and Polymers Lecture 4, 2010, 24 slides.
Danishkin, G. K. et al., "Development of a Continuous Method of Bending and Toughening Glass," Glass and Ceramics, vol. 34, Issue 8, Aug. 1977, pp. 495-498.
Daudeville, L. et al., "Numerical Simulation of Soda-Lime Silicate Glass Tempering," Journal de Physique IV, France, vol. 6, No. C1, Jan. 1996, pp. C1-175-C1-185.
Daudeville, Laurent et al., "Thermal Tempering Simulation of Glass Plates: Inner and Edge Residual Stresses," Journal of Thermal Stresses, vol. 21, 1998, pp. 667-689.
De Grauw, C. J. et al., "Axial resolution of confocal Raman microscopes: Gaussian beam theory and practice," Journal of Microscopy, vol. 188, Pt. 3, Dec. 1997, pp. 273-279.
Deschamps, T. et al., "Soda-lime silicate glass under hydrostatic pressure and indentation: a micro-Raman study," Abstract, 2011, 1 page.
Deschamps, T. et al., "Soda-lime silicate glass under hydrostatic pressure and indentation: a micro-Raman study," Journal of Physics: Condensed Matter, vol. 23, 2011, 7 pages.
Kong et al., "Residual Stress Analysis with Improved Numerical Methods for Tempered Plate Glasses Based on Structural Relaxation Model"; Metals and Materials International, vol. 13. No. 1 (2007); pp. 67-75.

\* cited by examiner

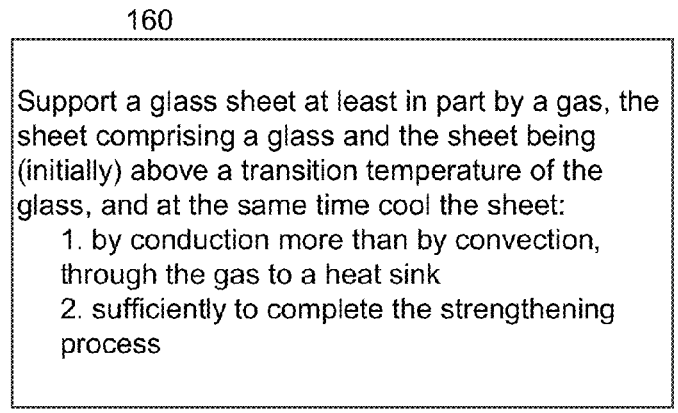

160

Support a glass sheet at least in part by a gas, the sheet comprising a glass and the sheet being (initially) above a transition temperature of the glass, and at the same time cool the sheet:
    1. by conduction more than by convection, through the gas to a heat sink
    2. sufficiently to complete the strengthening process

Heat a glass sheet sufficiently to bring the sheet above a transition temperature of the glass

130A

Position a first sheet surface facing a first heat sink surface across a first gap, the first heat sink surface having apertures therein

130B

Position a second sheet surface facing a second heat sink surface across a second gap, the second heat sink surface having apertures therein

160

Cool the sheet:
    1. by conduction more than by convection, through a gas to the respective heat sink surfaces
    2. enough to complete the strengthening process
    3. while feeding the gas to the first and second gaps through the apertures (only)

THERMALLY TEMPERED GLASS AND METHODS AND APPARATUSES FOR THERMAL TEMPERING OF GLASS

RELATED APPLICATIONS

This application claims the benefit of U.S. Application No. 62/031,856 filed Jul. 31, 2014, U.S. Application No. 62/074,838 filed Nov. 4, 2014, and U.S. Application No. 62/147,289 filed Apr. 14, 2015, each of which is incorporated by reference herein in its entirety.

BACKGROUND

This disclosure relates to improved thermally conditioned (strengthened or tempered) glass, particularly glass sheets, and improved methods and apparatuses for the thermal strengthening of glass, particularly for glass sheets.

In thermal (or "physical") strengthening of glass sheets, a glass sheet is heated to an elevated temperature above the glass transition temperature of the glass, then the surfaces of the sheet are rapidly cooled ("quenched"), while the inner regions of the sheet, insulated by the thickness and fairly low thermal conductivity of the glass, cool at a slower rate. This differential cooling produces a residual compressive stress in the glass surface regions, balanced by a residual tensile stress in the central regions of the glass. This is distinguished from chemical strengthening of glass, in which surface compressive stresses are generated by changing the chemical composition of the glass in regions nearer the surface, relative to the center, such as by ion diffusion. This also is distinguished from glass strengthening by combining or laminating together, while hot, layers of glass compositions having differing coefficients of thermal expansion, with lower expansion layers typically outermost, to result in surface compressive stresses upon return to ambient temperature. Relative to chemical strengthening and lamination, thermal strengthening processes are generally less expensive and much quicker to perform.

Thermally strengthened glass has advantages relative to unstrengthened glass. The surface compression of the strengthened glass provides greater resistance to fracture than unstrengthened glass. The increase in strength generally is proportional to the amount of surface compression. If a sheet possesses a sufficient level of thermal strengthening, relative to its thickness, then when and if the sheet is broken, it will divide into small fragments with dull edges rather than into large or elongated fragments with sharp edges. Glass that breaks into sufficiently small fragments, or "dices," as defined by various established standards, may be known as safety glass, or "fully tempered" glass, or sometimes simply "tempered" glass.

Because the degree of strengthening depends on the temperature difference between the surface and center of the glass sheet, thinner glasses require higher cooling rates to achieve a given stress. Also, thinner glass generally requires higher final values of surface compressive stress and central tension to achieve dicing into small particles upon breaking. Accordingly, achieving full tempering (dicing) in glass with sheet thicknesses of around 3 mm or less has been exceedingly challenging if not impossible.

SUMMARY

This disclosure relates, in part, to highly strengthened thin glass sheets and methods processes, and apparatuses that achieve surprisingly high levels of heat strengthening of glass sheets at thicknesses not achieved in the past exceeding the current state of the art of convective gas thermal strengthening of glass, desirably while contacting the glass only with a gas and while also decreasing the power requirements of the process. The apparatuses and methods disclosed enable thermal strengthening, including up to "full temper" or dicing behavior, in glass sheets having thicknesses down to at least as thin as 0.1 mm.

According to an embodiment of the present disclosure, a process for strengthening a sheet is provided. The process includes cooling a sheet having a material, the sheet having first and second sheet surfaces, the material having a transition temperature, the sheet being at a temperature greater than the transition temperature at the start of the cooling. The cooling is performed by (a) positioning the first sheet surface adjacent to a first heat sink surface with a first gap between the first sheet surface and the first heat sink surface such that thermal conduction from the first sheet surface to the first heat sink surface occurs, the first gap having a length across the first gap of $g_1$ and an area of the first gap of $A_{g1}$, (b) positioning the second sheet surface adjacent to a second heat sink surface with a second gap between the second sheet surface and the second heat sink surface such that thermal conduction from the second sheet surface to the second heat sink surface occurs, the second gap having a length across the second gap of $g_2$ and an area of the second gap of $A_{g2}$, (c) providing a first flow of a first gas to the first gap and providing a second flow of a second gas to the second gap, the first gas having a heat capacity $C_{p1}$ and a thermal conductivity $k_1$, the first flow provided at a mass flow rate $\dot{m}_1$ of the first gas, wherein $\dot{m}_1$ is greater than zero and less than $(2k_1 A_{g1})/(g_1 C_{p1})$, to the first gap, and at a mass flow rate $\dot{m}_2$ of the second gas, wherein $\dot{m}_2$ is greater than zero and less than $(2k_2 A_{g2})/(g_2 C_{p2})$, to the second gap, whereby the first and second flows contact the sheet, and the sheet is cooled by conduction more than by convection, (d) sufficiently to create a surface compressive stress and a central tension of the sheet.

According to another embodiment of the present disclosure, a method for thermally strengthening an article is provided. The method includes providing an article having a surface. The method further includes cooling or heating at least a portion of the surface of the article by conduction more than by convection, the conduction mediated through a gas to or from a heat sink or a heat source and not through direct contact between the surface and the heat sink or heat source, and sufficiently to thermally strengthen the article or at least a portion of the surface of the article. The conduction is performed, during at least some time of the heating or cooling, at a rate of at least 450 kW per square meter.

According to another embodiment of the present disclosure, a process for strengthening a sheet is provided. The process includes supporting at least a portion of a sheet on a first surface thereof, at least in part, by a flow or a pressure of a gas delivered to a gap between the first surface and a first heat sink, wherein the sheet includes a glass having a transition temperature and the sheet is at a temperature greater than the transition temperature of the glass. The process further includes cooling the sheet, by thermal conduction more than by convection, from the first surface of the sheet through the gas to a heat sink.

According to another embodiment of the present disclosure, a process for strengthening a sheet is provided. The process includes heating a sheet including a material and having first and second sheet surfaces, the material having a transition temperature, the heating performed sufficiently to bring the glass sheet above the transition temperature. The process further includes positioning the first sheet surface adjacent to a first heat sink surface across a first gap, the first heat sink surface having first multiple apertures, and positioning the second sheet surface adjacent to a second heat sink surface across a second gap, the second heat sink surface having second multiple apertures. The process also includes delivering a gas into the first and second gaps through the first and second multiple apertures and cooling the sheet by conduction more than by convection, and sufficiently to create a thermally induced surface compression and a thermally induced central tension in the sheet.

According to another embodiment of the present disclosure, an apparatus is provided. The apparatus includes a channel for receiving a heated sheet, conveying and cooling the heated sheet. The apparatus further includes a first heat sink having a first heat sink surface disposed adjacent to the channel and a second heat sink having a second heat sink surface disposed adjacent to the channel and opposite from the first heat sink. The apparatus also includes a channel gap defined by the first heat sink surface and the second heat sink surface. The first heat sink and the second heat sink include a plurality of apertures in fluid communication with a gas source and the channel gap, and the channel gap includes a thickness that facilitates cooling the heated sheet by conduction more than by convection.

According to another embodiment of the present disclosure, an apparatus is provided. The apparatus includes a heating zone for heating a glass sheet having a major surface and glass transition temperature to a temperature greater than the glass transition temperature to provide a heated glass sheet. The apparatus further includes a cooling zone for cooling the heated glass sheet from the temperature to provide a thermally strengthened glass sheet. The cooling zone includes two gas bearings, wherein one gas bearing is disposed on one side of a channel gap and one gas bearing is disposed on the opposite side of the channel gap, the two gas bearings configured to deliver a gas to the channel gap and the cooling of the heated glass sheet occurs by conduction more than by convection.

According to another embodiment of the present disclosure, an apparatus is provided. The apparatus includes a first heat sink having a first heat sink surface and a second heat sink having a second heat sink surface disposed opposite from the first heat sink. The apparatus further includes a channel gap between the first heat sink surface and the second heat sink surface. The channel gap consists of a gas and is configured to receive a heated glass sheet and cool the heated glass sheet by conduction more than by convection to provide a thermally strengthened sheet.

BRIEF DESCRIPTION OF THE DRAWINGS

FIG. 11 is a flow chart illustrating some aspects of a method according to the present disclosure.

FIG. 12 is a flow chart illustrating some aspects of another method according to the present disclosure.

DETAILED DESCRIPTION

There is a need for improvements in thermal processing of glass, both in methods and apparatuses for thermally strengthening glass and the resulting thermally strengthened sheets themselves. For example, in portable electronics there is a desire for thinner, but stronger optical-quality glass sheet materials and products comprising such glass sheets. Glass is very strong in compression but relatively weak against tension at the surface. By providing compression at the surface of a sheet, balanced by tension at the center where there is no exposed surface, the useful strength of a glass sheet is dramatically increased. However, while thermal strengthening is generally cheaper and faster relative to alternative methods of strengthening, it has suffered from limitations on its ability to be used in strengthening thin—e.g., 2-3 mm or less—glass sheets, because the level of strengthening depends on the temperature difference between the surface and center of the glass sheet and it is difficult to achieve a significant difference between the surface and center of a thin glass sheet. The present description provides improved methods and apparatuses for utilizing thermal strengthening to produce highly strengthened thin glass sheets. The methods and apparatuses solve the limitations in current processes, allowing for high levels of strengthening in glass sheets with thicknesses less than about 3 mm, less than 2 mm, less than 1.5 mm, less than 1.0 mm, less than 0.5 mm, less than about 0.25 mm, and less than about 0.1 mm.

Standard industrial processes for thermally strengthening glass involve heating glass sheets in a radiant energy furnace or a convection furnace (or a "combined mode" furnace using both techniques) to a predetermined temperature, then gas cooling ("quenching"), typically in the form of large amounts of ambient air blown against or along the glass surface. This gas cooling process is predominantly convective, whereby the heat transfer is by mass motion (collective movement) of the fluid, via diffusion and advection, as the gas carries heat away from the hot glass sheet.

Certain factors can restrict the amount of strengthening possible in glass sheets. Limitations exist, in part, because the amount of compressive stress on the finished sheet is related directly to the size of the temperature differential, between the surface and the center of the sheet, achieved during quenching. However, the larger the temperature differential during quenching, the more likely glass is to break. Breakage can be reduced, for a given rate of cooling, by starting the quench from a higher initial temperature of the sheet. Also, higher starting temperatures are known to be necessary to achieve the full strengthening potential of higher cooling rates. But increasing the temperature of the sheet at the start of the quench can lead to excessive deformation of the sheet as it becomes softer, again limiting the practically achievable temperature differential.

Figure 1:
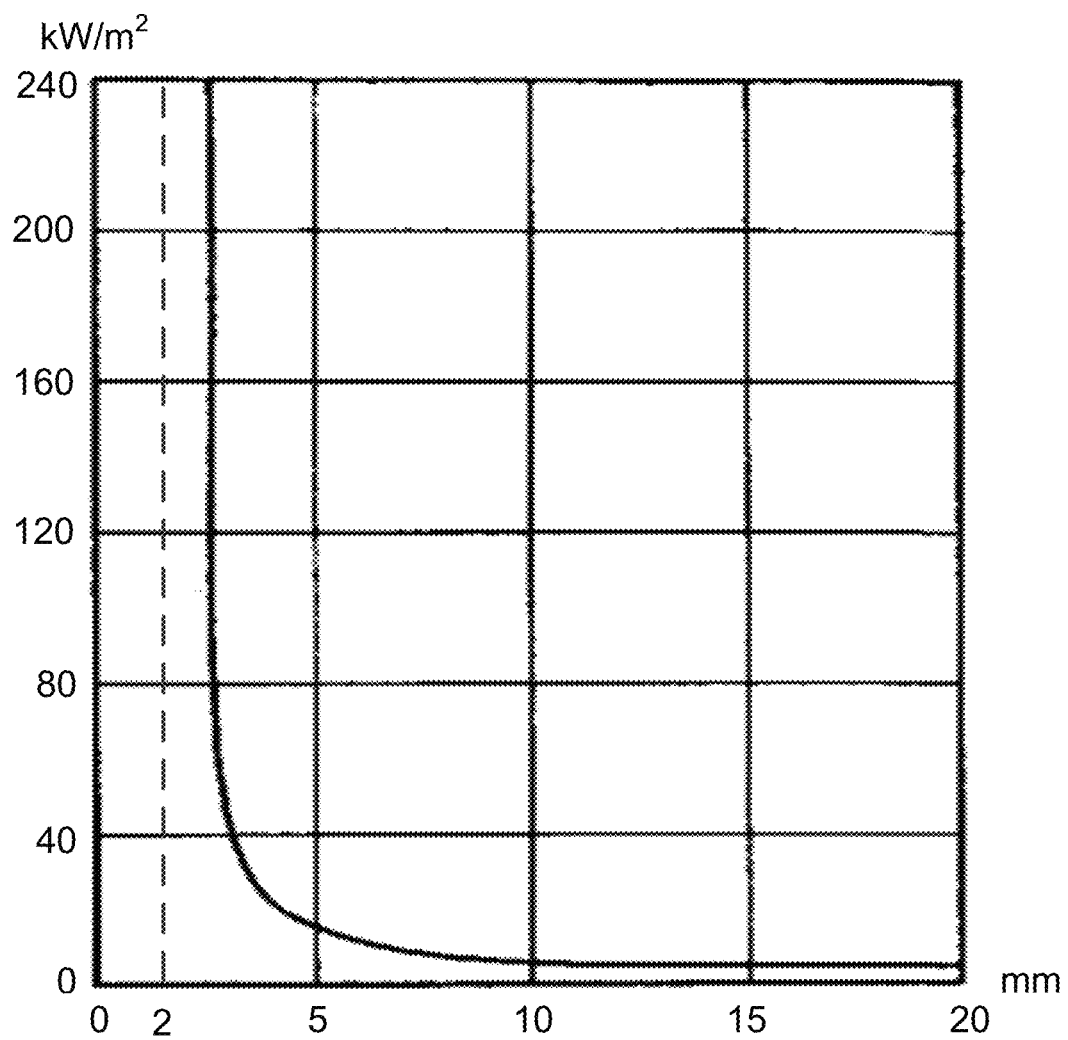
FIG. 1 (Prior Art) is a graph of blower power required for "full tempering" as a function of glass thickness.

Sheet thickness also imposes significant limits on the achievable temperature differential during quenching. The thinner the sheet, the lower the temperature differential between the surface and the center for a given cooling rate during quenching, because there is less glass thickness to thermally insulate the center from the surface. Accordingly, thermal strengthening of thin glass requires higher cooling rates and, thus, faster removal of heat from the external surfaces of the glass, requiring significant energy consumption. FIG. 1 shows a the power in kilowatts per square meter of glass sheet area required by air blowers employed to blow sufficient ambient air to "fully temper" soda lime glass ("SLG"), as a function of glass thickness in millimeters, based on industry standard thermal strengthening processes of about 35 years ago. The power required increases exponentially as the glass used gets thinner, thus glass sheets of about 3 mm in thickness were the thinnest fully tempered commercial glass available for many years. Further, the thinner the sheet, the greater the likelihood of deformation at a given softness (that is, at a given viscosity) of the glass. Therefore, decreasing thickness both reduces the achievable temperature differential directly and, because of increased risk of deformation of the sheet, tends to reduce the opportunity to use higher sheet temperatures to achieve the full benefits of higher cooling rates and to prevent glass breakage caused by higher cooling rates.

Figure 2:
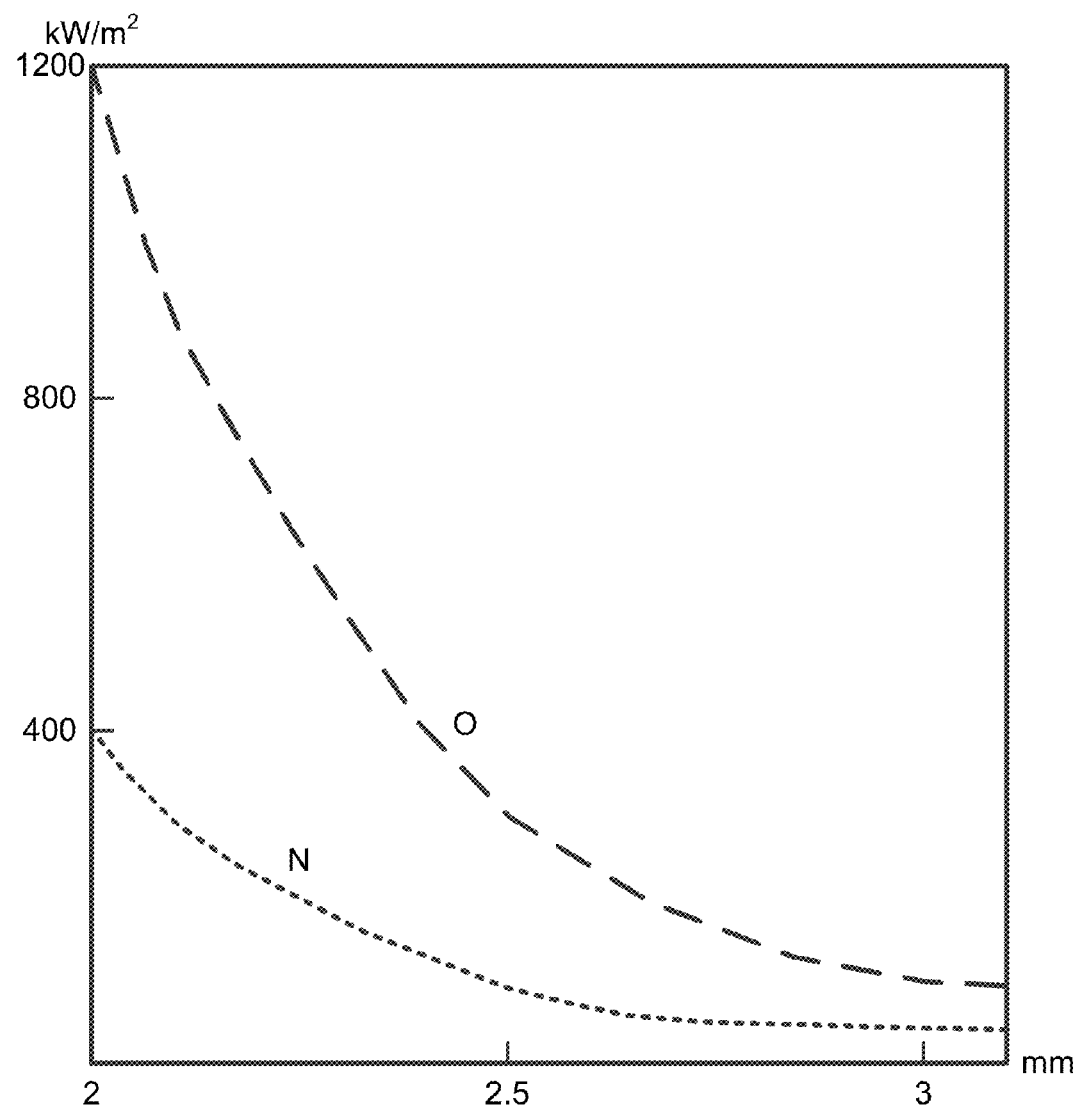
FIG. 2 (Prior Art) is a graph of blower power required for "full tempering" as a function of glass thickness for an old process or machine O and a new process or machine N.

More recently, the performance curves of FIG. 2 (Prior Art) were published using state of the art glass thermal strengthening equipment. This improved equipment continues to use traditional air blown convective processes to cool the glass, but replaces rollers used to support the glass during heating with a system that utilizes air to support the glass during at least the last stages of heating. Without roller contact, the glass can be heated to higher temperatures (and higher softness/lower viscosity) prior to quenching, reportedly allowing the production of fully tempered glass at 2 mm thickness. As shown in FIG. 2, the reported blower power required to strengthen a 2 mm thick sheet is reduced from 1200 kW/m$^2$ to 400 kW/m$^2$ at the higher temperatures enabled by using air to support the glass (curve N) as compared to using rollers (curve O).

Figure 3:
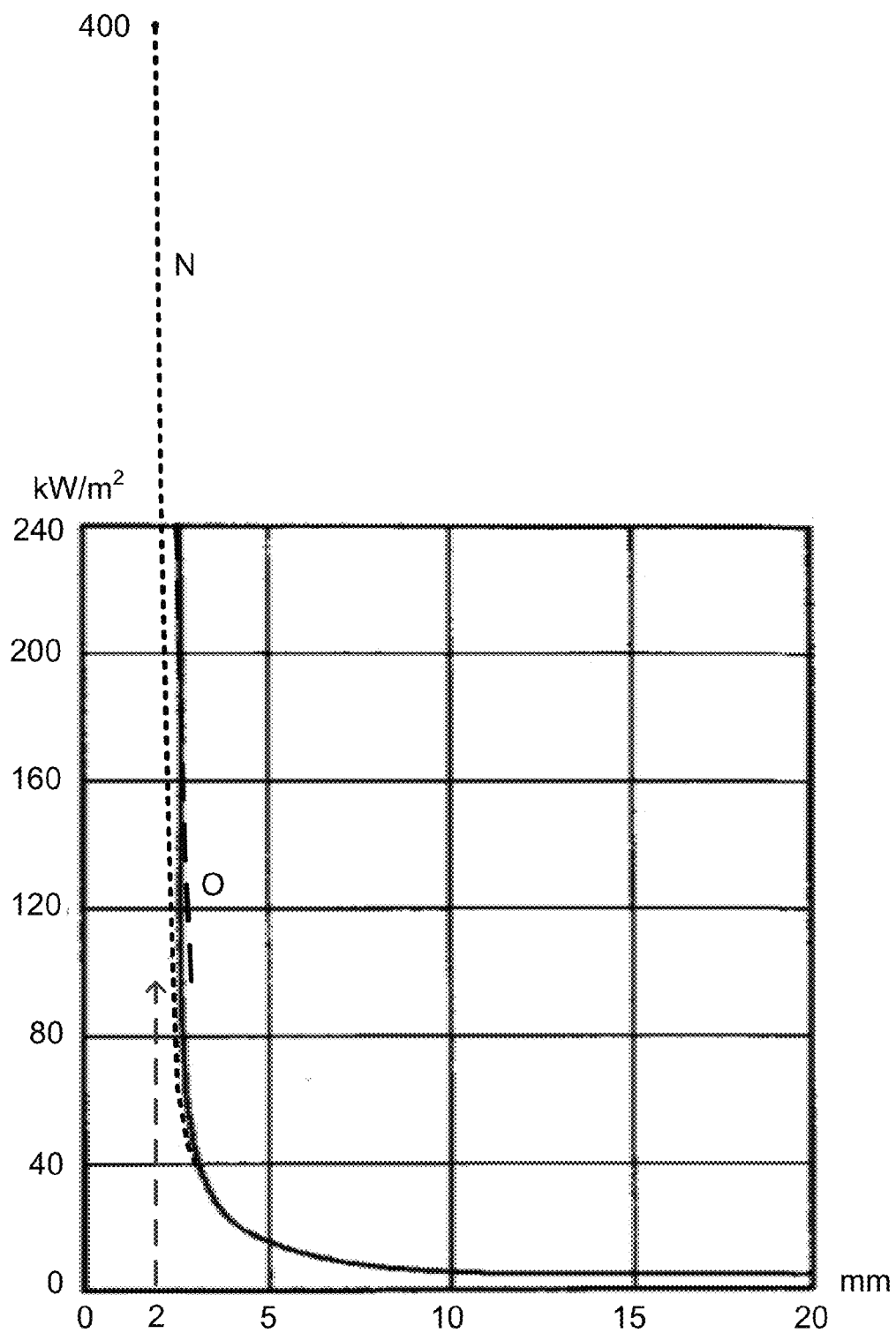
FIG. 3 (Prior Art) is a graph of the old curve O and the new curve N of FIG. 2 scaled to match and superimposed upon the graph of FIG. 1.

Although it represents progress to be able to produce fully tempered 2 mm thick glass, scaling the old and new curves O and N of FIG. 2 to match the scale of FIG. 1, as shown in FIG. 3 (Prior Art), shows that the improvement in performance achieved by the new process is relatively small and simply an incremental change in the previous understanding of the energy needs in convective strengthening of glass sheets. In FIG. 3 the old and new curves O and N of FIG. 2 are scaled to match the graph of FIG. 1, and overlaid thereon (with the old curve O truncated at the top at 240 kW/m$^2$ for easier viewing of the new curve N). From FIG. 3 it is apparent that the technology represented by the curve N changes only slightly the performance curve of convective gas quenching processes toward the thin glass side. The high operating point (400 kW/m$^2$ of blower power for 2 mm glass) shows the extreme increase in power still required to process thinner glass by this method. The sharp increase in airflow and, thus, power needed suggests the difficulty, as a matter of both engineering practice and economics, in going below 2 mm thickness while producing fully tempered glass using conventional convective gas strengthening methods. Additionally, the very high airflows needed also could deform the shape of thinner sheets. Accordingly, to reach full temper of glass having a thickness of less than 2 mm or to reach full temper at 2 mm in glasses having coefficients of thermal expansion ("CTE") lower than that of soda lime glasses, another method is needed.

Alternative methods to current commercial convective gas strengthening have been tried as well, but each has certain drawbacks relative to convective gas strengthening. In particular, methods of achieving higher cooling rates generally require at least some liquid or solid contact with the sheet surfaces, rather than only gas. As described in more detail below, such contact with the glass sheet can adversely affect glass surface quality, glass flatness, and/or evenness of the strengthening process. These defects sometimes can be perceived by the human eye, particularly when viewed in reflected light.

Liquid contact strengthening, in the form of immersion in liquid baths or flowing liquids, as well as in the form of spraying, has been used to achieve higher cooling rates than convective gas strengthening, but has the drawback of causing excessive thermal variations across a sheet during the cooling process. In immersion or immersion-like spraying or flowing of liquids, large thermal variations over small areas can occur due to convection currents that arise spontaneously within the liquid bath or liquid flow. In finer spraying, the discrete spray droplets and the effects of nozzle spray patterns also produce significant thermal variations. Excessive thermal variations tend to cause glass breakage during thermal strengthening by liquid contact, limiting the cooling rates and resulting strengths that can be achieved. The necessary handling of the sheet (to position or hold it within the liquid bath or liquid flow or liquid spray) also causes physical stress and excessive thermal variations from physical contact with the sheet, tending also to cause breakage during strengthening and limiting the cooling rates and resulting strengths. Finally, some liquid cooling methods, such as high cooling rate quenching by oil immersion and various spraying techniques, can alter the glass surface during such cooling, requiring later removal of glass material from the sheet surface to produce a satisfactory finish.

Solid contact thermal strengthening involves contacting the surface of the hot glass with a cooler solid surface. As with liquid contact strengthening, excessive thermal variations, like those seen in liquid contact strengthening, can easily arise during the quenching process. Any imperfection in the surface finish of the glass sheet, or in the quenching surfaces, or in the consistency of the thickness of the sheet, results in imperfect contact over some area of the sheet, causing large thermal variations that tend to break the glass during processing, and resulting in unwanted birefringence if the sheet survives. Additionally, contacting the hot glass sheet with a solid object can lead to the formation of surface defects, such as chips, checks, cracks, scratches, and the like. Achieving good contact over the entirety of the surfaces of a sheet also can become increasing difficult as the dimensions of the sheet increase. Physical contact with a solid surface also can stress the sheet mechanically during quenching, adding to the likelihood of breaking the sheet during the process. Further, the extremely high rate temperature changes at the initiation of contact can cause breakage during sheet processing and, as such, contact cooling of thin glass substrates has not been commercially viable.

The present disclosure surpasses the traditional processes described above to effectively, efficiently, and evenly thermally strengthen thin glass sheets at commercial scales without damaging the surface of the glass, inducing birefringence or uneven strengthening, or causing unacceptable breakage. Conventionally in convective gas glass strengthening, higher rates of cooling are achieved by increasing the rate of air flow, decreasing the distance of air nozzle openings to the glass sheet surface, increasing the temperature of the glass (at the start of cooling), and optionally, decreasing the temperature of the cooling air.

Previously unobtainable glass sheets can be produced by one or more of the embodiments disclosed herein. This is a result of providing very high heat transfer rates in a precise manner, with good physical control and gentle handling of the glass. Control of (form and) flatness in a small-gap gas bearing allows for processing sheets at higher relative temperatures at the start of cooling resulting in higher thermal strengthening levels. As described below, the result is glass sheets with unique properties.

Some embodiments of glass sheets treated by methods and/or apparatuses according to the present disclosure have higher levels of permanent thermally induced stresses than previously known. Without wishing to be bound by theory, this is believed that the achieved levels of thermally induced stress were obtainable for a combination of reasons. The high uniformity of the heat transfer in the processes detailed herein reduces or removes physical and unwanted thermal stresses in the glass, allowing glass sheets to be tempered at higher heat transfer rates without breaking. Further, the present methods can be performed at lower glass sheet viscosities (higher initial temperatures at the start of quench), while still preserving the desired (form and) flatness, which provides a much greater change in temperature in the cooling process, thus increasing the heat strengthening levels achieved.

Figure 4:
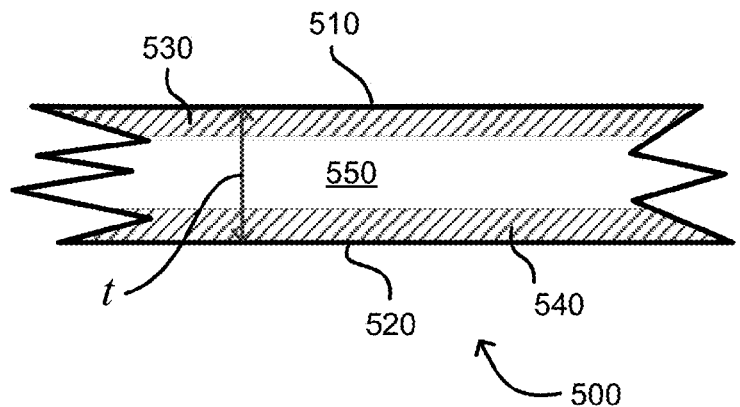
FIG. 4 is a diagrammatic cross partial cross section of a thermally strengthened glass sheet according to one or more embodiments of the present disclosure.

A first embodiment comprises a thermally strengthened glass sheet having a high surface compressive stress or a high central tension. FIG. 4 is a diagrammatic cross partial cross section of a thermally strengthened glass sheet 500 according to one or more embodiments. The glass sheet 500 has a thickness t and first and second major surfaces 510, 520 separated by the thickness t. Glass sheet 500 also includes a length l and a width w. In exemplary embodiments, thickness t of glass sheet 500 is less than length l of glass sheet 500. In other exemplary embodiments, thickness t of glass sheet 500 is less than width w of glass sheet 500. In yet other exemplary embodiments, thickness t of glass sheet 500 is less than length l and width w of glass sheet 500. The glass sheet 500 further has regions of permanent thermally induced compressive stress 530 and 540 at and/or near the first and second major surfaces 510, 520, balanced by a region of permanent thermally induced central tensile stress 550 (i.e., tension) in the central portion of the sheet.

Compressive stresses of glasses resulting from the processes disclosed herein can vary as a function of thickness of the glasses. In embodiments, glasses having a thickness of 3 mm or less have a compressive stress of at least 80 MPa, at least 100 MPa, at least 150 MPa, at least 200 MPa, at least 250 MPa, at least 300 MPa, at least 350 MPa, at least 400 MPa, and/or no more than 1 GPa. In contemplated embodiments, glasses having a thickness of 2 mm or less have a compressive stress of at least 80 MPa, at least 100 MPa, at least 150 MPa, at least 175 MPa, at least 200 MPa, at least 250 MPa, at least 300 MPa, at least 350 MPa, at least 400 MPa, and/or no more than 1 GPa. In contemplated embodiments, glasses having a thickness of 1.5 mm or less have a compressive stress of at least 80 MPa, at least 100 MPa, at least 150 MPa, at least 175 MPa, at least 200 MPa, at least 250 MPa, at least 300 MPa, at least 350 MPa, and/or no more than 1 GPa. In contemplated embodiments, glasses having a thickness of 1 mm or less have a compressive stress of at least of at least 80 MPa, at least 100 MPa, at least 150 MPa, at least 175 MPa, at least 200 MPa, at least 250 MPa, at least 300 MPa, and/or no more than 1 GPa. In contemplated embodiments, glasses having a thickness of 0.5 mm or less have a compressive stress of at least 50 MPa, at least 80 MPa, at least 100 MPa, at least 150 MPa, at least 175 MPa, at least 200 MPa, at least 250 MPa, and/or no more than 1 GPa.

In some embodiments, the thermally induced central tension may be greater than 40 MPa, or greater than 50 MPa, or greater than 75 MPa, or greater than 100 MPa. In other embodiments, the thermally induced central tension may be less than 300 MPa, or less than 400 MPa. The thermally induced central tension may be from about 50 MPa to about 300 MPa, about 60 MPa to about 200 MPa, about 70 MPa to about 150 MPa, or about 80 MPa to about 140 MPa.

If sufficient energy is stored in the region of tensile stress 550, the glass will break like safety glass or "dice" when sufficiently damaged. As used herein, a glass sheet is considered to dice when an area of the glass sheet 25 cm$^2$ breaks into 40 or more pieces. In some embodiments, dicing is used as a qualitative measure of showing that the glass sheet is "fully tempered" (i.e., for 2 mm or thicker glass, where the glass sheet has a compressive stress of at least 65 MPa or an edge compression of at least 67 MPa).

Another aspect comprises thermally strengthened glass sheets having high fictive temperatures and increased damage resistance. Surface fictive temperatures may be determined by any suitable method, including differential scanning calorimetry, Brillouin spectroscopy, or Raman spectroscopy.

In some methods of determining surface fictive temperatures, it may be necessary to break the glass to relieve the "temper stresses" induced by the heat strengthening process in order to measure fictive temperature with reasonably accuracy. It is well known that characteristic structure bands measured by Raman spectroscopy shift in a controlled manner both with respect to the fictive temperature and with respect to applied stress in silicate glasses. This shift can be used to non-destructively measure the fictive temperature of a thermally strengthened glass sheet if the temper stress is known.

Stress effects on the Raman spectrum of silica glass are reported in D. R. Tallant, T. A. Michalske, and W. L. Smith, "The effects of tensile stress on the Raman spectrum of silica glass," *J. Non-Cryst. Solids,* 106 380-383 (1988). Commercial glasses of 65 wt % silica or more have substantially the same response. Although the reported stress response is for uniaxial stress, in the case of a unibiaxial stress state such as that which is observed in tempered glass, $\sigma_{xx}=\sigma_{yy}$, the peak can be expected to shift by twice that expected by a uniaxial stress. The peak near 1090 cm$^{-1}$ in soda-lime glass and in glass 2 corresponds to the 1050 cm$^{-1}$ peak observed in silica glass. The effects of stress on the 1050 peak in silica, and on the corresponding peak in SLG and other silicate glasses can be expressed, as a function of stress σ in MPa, by a) $\omega$(cm$^{-1}$)=1054.93−0.00232·σ.

A calibration curve was produced of Raman band position as a function of the fictive temperature for SLG and another glass, glass 2. Glass samples were heat-treated for various times, 2-3 times longer than the structural relaxation times calculated by τ=10*η/G, where η is the viscosity, and G the shear modulus. After heat-treatment the glasses were quenched in water to freeze the fictive temperature at the heat-treatment temperature. The glass surfaces were then measured by micro Raman at 50× magnification and a 1-2 µm spot size using a 442 nm laser, 10-30 s exposure time, and 100% power, over the range of 200-1800 cm$^{-1}$. The position of the peak at 1000-1200 cm$^{-1}$ was fit using computer software, Renishaw WIRE version 4.1 in this case. A good fit of the 1090 cm$^{-1}$ Raman peak measured in SLG on the air side as a function of fictive temperature Tf (in ° C.) is given by b) $\omega$(cm$^{-1}$)=1110.66−0.0282·Tf. For glass 2, a good fit is given by c) $\omega$(cm$^{-1}$)=1102.00−0.0231·Tf.

Using the relationships established in equations a), b), and c), it is possible to express the fictive temperature of the glass as a function of a measured Raman peak position with a correction factor due to surface compressive stress. A compressive stress of 100 MPa, $\sigma_c$, shifts the Raman band position equivalent to approximately a 15 to 20 degree Celsius reduction in the fictive temperature. The following equation is applicable to SLG:

$$T_f(° C.) = \left[\frac{\omega(cm^{-1}) - 1110.66\ (cm^{-1})}{-0.0282\left(\frac{cm^{-1}}{° C.}\right)}\right] + 2[0.082 * \sigma_c(MPa)] \quad (1)$$

The equation applicable to glass 2 is:

$$T_f(° C.) = \left[\frac{\omega(cm^{-1}) - 1102\ (cm^{-1})}{-0.0231\left(\frac{cm^{-1}}{° C.}\right)}\right] + 2[0.0996 * \sigma_c(MPa)] \quad (2)$$

In these equations, w is the measured peak wavenumber for the peak near 1090 cm$^{-1}$, $\sigma_c$ is the surface compressive stress measured by any suitable technique, yielding stress-corrected measurement of fictive temperature in ° C.

As a demonstration of increased damage resistance, four glass sheet samples were prepared, two 6 mm soda lime glass (SLG) sheets by conventional tempering methods to approximately 70 and 110 MPa surface compressive stress (CS), and two 1.1 mm SLG by the methods and apparatuses disclosed herein to about the same levels of CS. Two additional sheets, one of each thickness were used as controls. The surfaces of each test sheet were subjected to standard Vickers indentation. Various levels of force were applied, for 15 seconds each, and after a 24 hour wait, indentations were each examined. As shown in Table I, the 50% cracking threshold (defined as the load at which the average number of cracks appearing is two out of the four points of the indenter at which cracks tend to initiate) was determined for each sample.

The table shows that the Vickers crack initiation threshold for SLG processed by conventional convective gas tempering (as reflected in the 6 mm sheet) is essentially the same as that for annealed or as-delivered SLG sheets, rising from between zero and one Newton to about one to less than two Newtons. This correlates with the relatively modest rise in surface fictive temperature ($T_{fs}$ or $Tf_{surface}$) of −25 to 35° C. relative to glass transition temperature ($T_g$=550° C. for SLG, defined as 11=10$^{12-13.3}$ Poise) that was provided by conventional tempering. In contrast, by tempering using the present methods and apparatuses, the Vickers crack initiation threshold improved to greater than 10 N, a 10-fold increase over the Vickers damage resistance imparted by conventional tempering. In the embodied glasses, the $T_{fs}$ minus $T_g$ was at least 50° C., or at least 75° C., or at least 90° C., or in the range of from approximately 75° C. to 100° C. Even in embodiments comprising lower levels of heat strengthening, the embodied glasses can still provide increased resistance, at levels such as 5 N, for instance. In certain contemplated embodiments, the 50% cracking threshold after a 15 second Vickers crack initiation test may be equal to or greater than 5 N, 10 N, 20 N, or 30 N.

TABLE I

| Sample | Thickness (mm) | CS (MPa) | Surface $T_f$ (° C.) | Cracking Threshold (N) |
|---|---|---|---|---|
| Control | 1.1 | Annealed | ~$T_g$ (550) | 0-1 |
| Control | 6 | Annealed | ~$T_g$ (550) | 0-1 |
| Thin low strength | 1.1 | −72 | 626 | 10-20 |
| Thick low strength | 6 | −66 | 575 | 1-2 |
| Thin medium strength | 1.1 | −106 | 642 | 10-20 |
| Thick medium strength | 6 | −114 | 586 | 1-2 |

Figure 5:
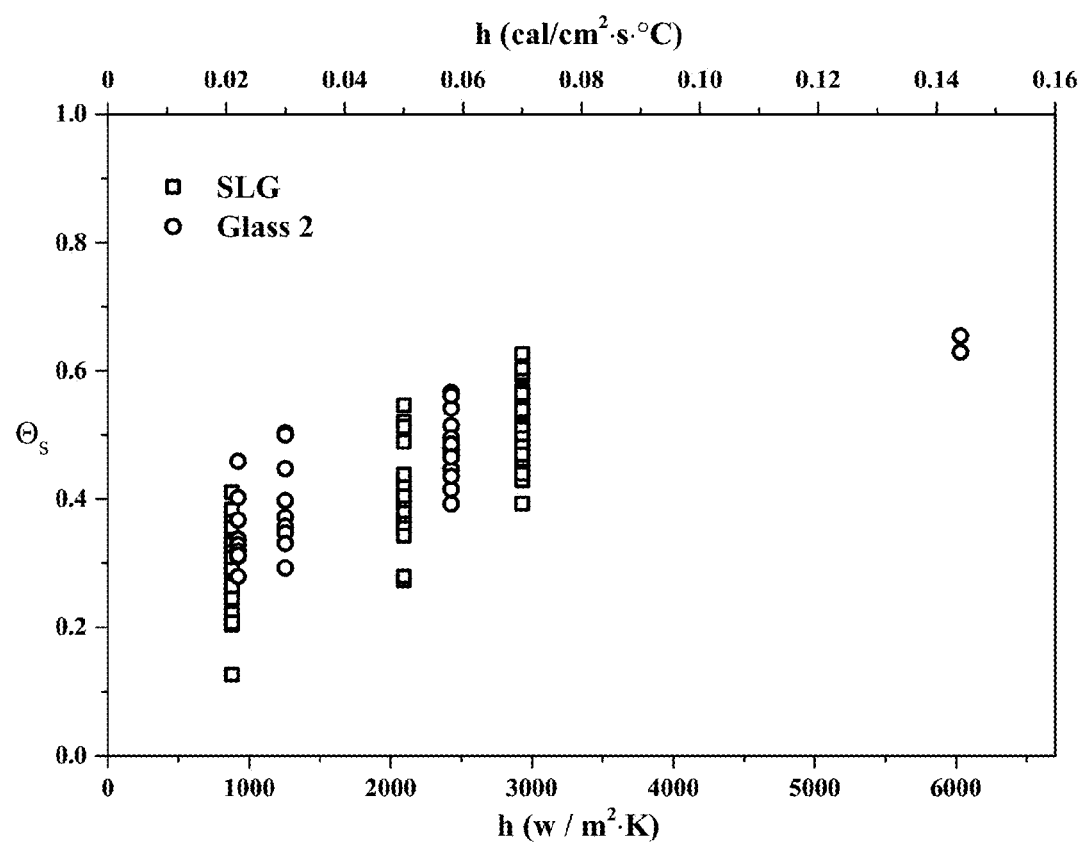
FIG. 5 is a plot of the a non-dimensional surface fictive temperature parameter θs for fictive temperatures obtained by one or more embodiments of methods and apparatuses of the present invention.

The following non-dimensional fictive temperature parameter θ can be used to compare the relative performance of a thermal strengthening process in terms of the fictive temperature produced. Given in terms of surface fictive temperature θs in this case:

$$\theta s = (T_{fs} - T_{anneal})/(T_{soft} - T_{anneal}) \quad (3)$$

where $T_{fs}$ is the surface fictive temperature, $T_{anneal}$ (the temperature of the glass at a viscosity of η=10$^{13.2}$ Poise) is the annealing point and $T_{soft}$ (the temperature of the glass at a viscosity of η=10$^{7.6}$ Poise) is the softening point of the glass of the sheet. FIG. 5 is a plot of Os for measured surface fictive temperatures as a function of heat transfer rate, h, applied during thermal strengthening for two different glasses. As shown in the figure, the results for the two different glasses overlie each other fairly closely. This means that parameter θ provides a means to compare the fictive temperatures of different glasses compared directly, in relation to the heat transfer rate h required to produce them. The vertical range of results at each h corresponds to variation in the value of $T_0$, the initial temperature at the start of quenching. In embodiments, parameter θs comprises from about 0.2 to about 0.9, or about 0.21 to about 0.09, or about 0.22 to about 0.09, or about 0.23 to about 0.09, or about 0.24 to about 0.09, or about 0.25 to about 0.09, or about 0.30 to about 0.09, or about 0.40 to about 0.09, or about 0.5 to about 0.9, or about 0.51 to about 0.9, or about 0.52 to about 0.9, or about 0.53 to about 0.9, or about 0.54 to about 0.9, or about 0.54 to about 0.9, or about 0.55 to about 0.9, or about 0.6 to about 0.9, or even about 0.65 to about 0.9.

Another aspect comprises a thermally strengthened glass sheet having a high temperability and/or heat transfer value. The "specific thermal stress" of a glass is given by:

$$\frac{\alpha \cdot E}{1-\mu} \quad (4)$$

where α is the (low temperature linear) CTE of the glass, E is the modulus of elasticity and μ is Poisson's ratio. This value is used to indicate the level of stress produced within a given glass composition when subjected to a temperature gradient. It may also be used as an estimator of thermal "temperability." At higher thermal transfer rates (such as at about 800 W/m²K and above, for example), however, the high temperature or "liquidus" CTE of the glass begins to affect tempering performance, therefore, under such conditions, the temperability parameter V based on an approximation of integration over the changing CTE values across the viscosity curve, is found to be useful:

$$\Psi = E \cdot [T_{strain} \cdot \alpha_{CTE}^s + \alpha_C^{TEL} \cdot (T_{soft} - T_{strain})] \quad (5)$$

where $\alpha_{CTE}^S$ is the low temperature linear CTE (equivalent to the average linear expansion coefficient from 0-300° C. for the glass), expressed in 1/° C. (° C.$^{-1}$), $\alpha_{CTE}^L$ is the high temperature linear CTE (equivalent to the high-temperature plateau value which is observed to occur somewhere between the glass transition and softening point an elastic modulus), expressed in 1/° C. (° C.$^{-1}$), E is the elastic modulus of the glass, expressed in GPa (not MPa) (which allows values of the (non-dimensional) parameter V to range generally between 0 and 1), $T_{strain}$ is the strain point temperature of the glass, (the temperature of the glass at a viscosity of $\eta=10^{14.7}$ Poise) expressed in ° C., and $T_{soft}$ is the softening point of the glass (the temperature of the glass at a viscosity of $\eta=10^{7.6}$ Poise), expressed in ° C.

The thermal strengthening process and resulting surface compressive stresses were modeled for glasses having varying properties to determine the tempering parameter, Ψ. The glasses were modeled at the same starting viscosity of $10^{8.2}$ Poise and at varying heat transfer coefficients. The properties of the various glasses are shown in Table II, together with the temperature for each glass at $10^{8.2}$ Poise and the calculated value of the temperability parameter Ψ for each.

TABLE II

| Glass | Modulus | CTE low | CTE high | $10^{8.2}$ Poise ° C. | Softening Point ° C. | Strain Point ° C. | Ψ |
|---|---|---|---|---|---|---|---|
| SLG | 72 | 8.8 | 27.61 | 705 | 728 | 507 | 0.76 |
| 2 | 73.3 | 8.53 | 20.49 | 813 | 837 | 553 | 0.77 |
| 3 | 65.5 | 8.26 | 26 | 821 | 862 | 549 | 0.83 |
| 4 | 65 | 8.69 | 20.2 | 864 | 912 | 608 | 0.74 |
| 5 | 63.9 | 10.61 | 22 | 849 | 884 | 557 | 0.84 |
| 6 | 58.26 | 3.5 | 20.2 | 842 | 876 | 557 | 0.49 |
| 7 | 73.6 | 3.6 | 13.3 | 929 | 963 | 708 | 0.44 |
| 8 | 81.1 | 3.86 | 12.13 | 968 | 995 | 749 | 0.48 |

Figure 6:
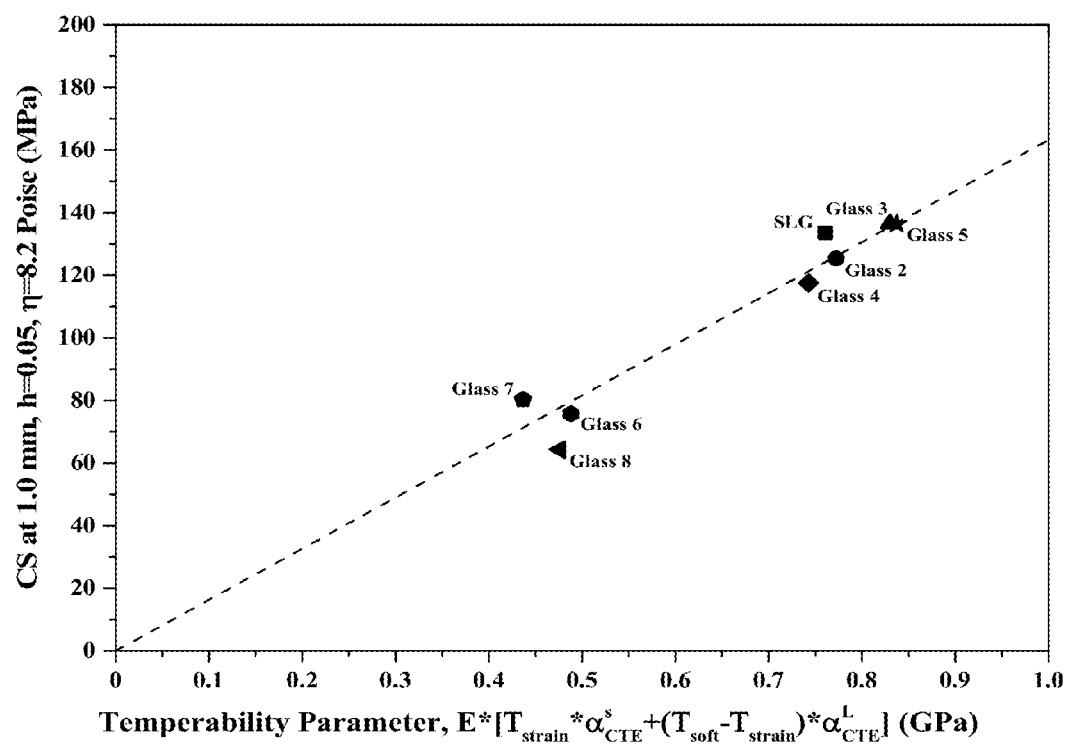
FIG. 6 is a plot of surface compression stresses calculated by simulation for differing glass compositions, plotted against a proposed temperability parameter Ψ for the various compositions shown.

The results in Table III show that V is proportional to the thermal strengthening performance of the glass. This correlation is further shown in FIG. 6, which provides an embodied example for a high heat transfer rate (a heat transfer coefficient of 2093 W/m²K (0.05 cal/s·cm²·° C.)) and a glass sheet thickness of only 1 mm. As seen in the figure, the variation in the seven differing glasses' resulting compressive stress correlates well with the variation in the proposed temperability parameter Ψ.

In another aspect, it has been found that for any glass, at any given value of the heat transfer coefficient, h (expressed in cal/cm²-s-° C.), the curves of surface compressive stress ($\sigma_{CS}$, in MPa) vs. thickness (t, in mm) can be fit (over the range of t from 0 to 6 mm) by the hyperbola, where $P_1$ and $P_2$ are functions of h such that:

$$\sigma_{CS}(Glass, h, t) = C(h, t) * \Psi(Glass) = \frac{P_1(h) * t}{(P_2(h) + t)} * \Psi(Glass) \quad (6)$$

or with the expression for Ψ substituted in, the curve of compressive stress $\sigma_{CS}$(Glass, h, t) is given by:

$$\frac{P_1(h) * t}{(P_2(h) + t)} \cdot E \cdot [T_{strain} \cdot \alpha_{CTE}^s + \alpha_{CTE}^L \cdot (T_{soft} - T_{strain})] \quad (7)$$

where the constants $P_1$, $P_2$, in either (6) or (7) above, are each continuous functions of the heat transfer value, h, given by:

$$P_1 = 910.2 - 259.2 \cdot \exp\left(-\frac{h}{0.143}\right) \quad (8)$$

and $$P_2 = 2.53 + \frac{23.65}{\left(1 + \left(\frac{h}{0.00738}\right)^{1.58}\right)} \quad (9)$$

Figure 7:
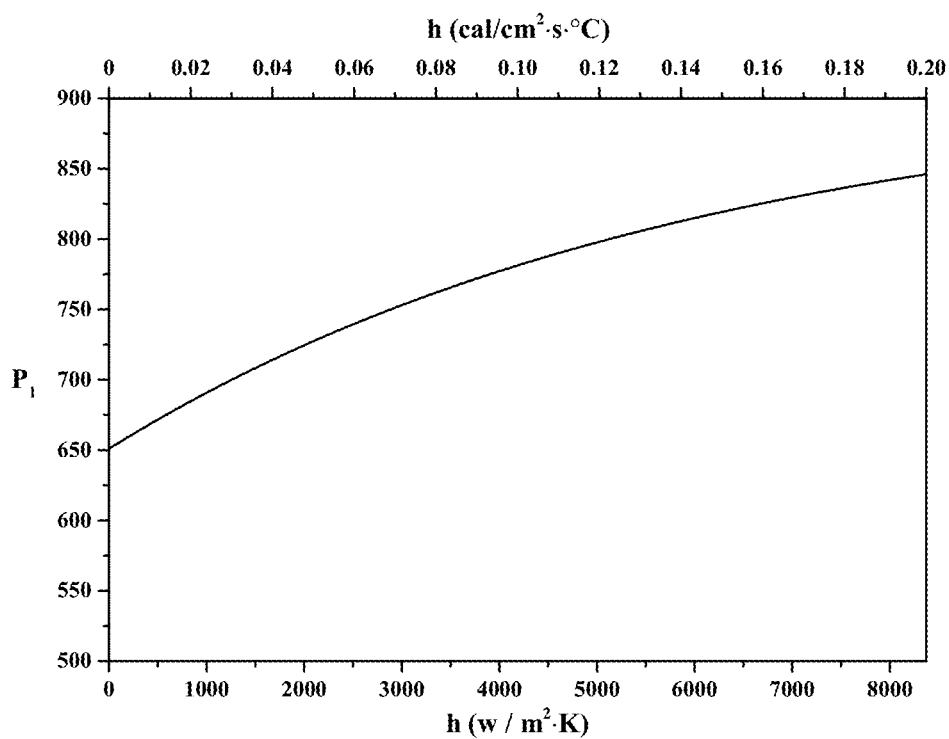
FIGS. 7 and 8 are graphs of two parameters P1 and P2 as a function of heat transfer coefficient h.
Figure 8:
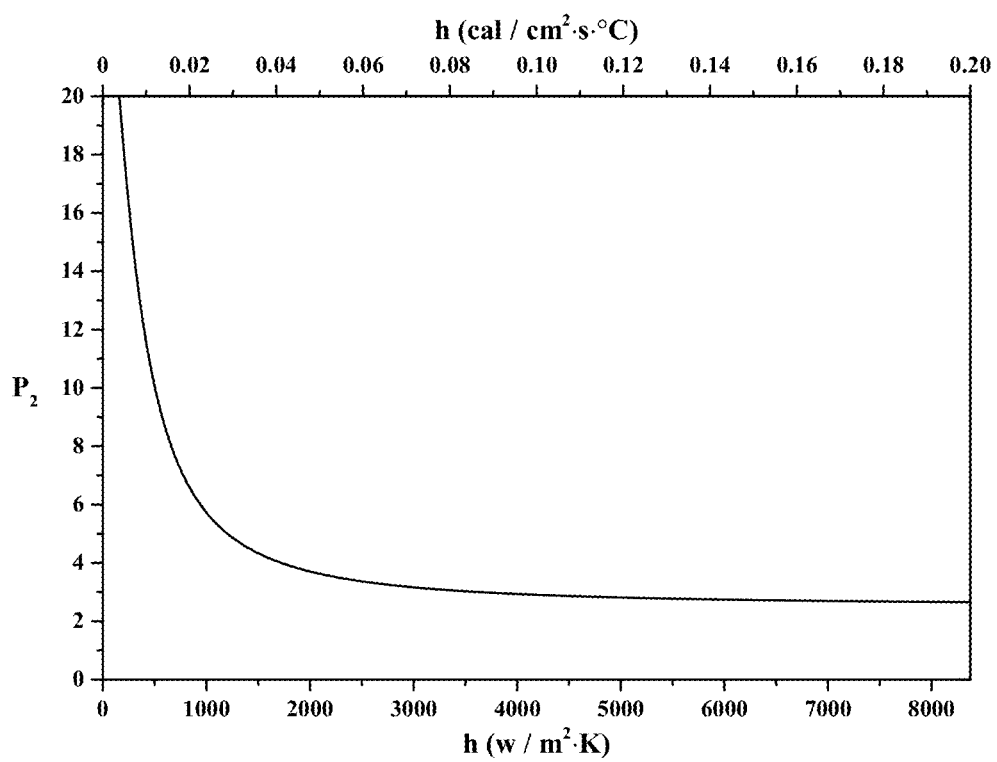

The constants $P_1$, $P_2$, are graphed as functions of h in FIGS. 7 and 8, respectively. Accordingly, by using a value of $P_1$, for a given h and the corresponding $P_2$, for that same h in expression (6) or (7) above, a curve is specified corresponding to the surface compressive stress (CS) obtainable at that h, as a function of thickness t.

In some embodiments, a similar expression may be used to predict the central tension (CT) of a thermally strengthened glass sheet, particularly at a thickness of 6 mm and less, and the thermal transfer coefficient, such as 800 W/m²K and up, by simply dividing the compressive stress predicted under the same conductions by 2. Thus, expected central tension may be given by $$\frac{P_{1CT}(h_{CT}) * t}{(P_{2CT}(h_{CT}) + t)} \cdot E \cdot [T_{strain} \cdot \alpha_{CTE}^s + \alpha_{CTE}^L \cdot (T_{soft} - T_{strain})] \quad (10)$$

Where $P_{1CT}$ and $P_{2CT}$ are given as follows:

$$P_{1CT} = 910.2 - 259.2 \cdot \exp\left(-\frac{h_{CT}}{0.143}\right) \quad (11)$$

and $$P_{2CT} = 2.53 + \frac{23.65}{\left(1 + \left(\frac{h_{CT}}{0.00738}\right)^{1.58}\right)} \quad (12)$$

In some embodiments, h and $h_{CT}$, may have the same value for a given physical instance of thermal strengthening. However, in some embodiments, they may vary and providing separate variables and allowing variation between them allows for capturing within descriptive performance curves instances in which the typical ratio of 2:1 CS/CT does not hold.

One or more embodiments of the currently disclosed processes and apparatuses have produced thermally strengthened SLG sheets at all of the heat transfer rate values (h and $h_{CT}$) shown in Table III.

TABLE III

Table IV(h and $h_{CT}$ values according to exemplary embodiments)

| cal/s · cm² · ° C. | W/m²K |
|---|---|
| 0.010 | 418.68 |
| 0.013 | 544.284 |
| 0.018 | 753.624 |
| 0.019 | 795.492 |
| 0.020 | 837.36 |
| 0.021 | 879.228 |
| 0.022 | 921.096 |
| 0.023 | 962.964 |
| 0.027 | 1130.436 |
| 0.028 | 1172.304 |
| 0.029 | 1214.172 |
| 0.030 | 1256.04 |
| 0.031 | 1297.908 |
| 0.033 | 1381.644 |
| 0.034 | 1423.512 |
| 0.038 | 1590.984 |
| 0.040 | 1674.72 |
| 0.041 | 1716.588 |
| 0.042 | 1758.456 |
| 0.045 | 1884.06 |
| 0.047 | 1967.796 |
| 0.048 | 2009.664 |
| 0.049 | 2051.532 |
| 0.050 | 2093.4 |
| 0.051 | 2135.268 |
| 0.052 | 2177.136 |
| 0.053 | 2219.004 |
| 0.054 | 2260.872 |
| 0.055 | 2302.74 |
| 0.060 | 2512.08 |
| 0.061 | 2553.948 |
| 0.062 | 2595.816 |
| 0.063 | 2637.684 |
| 0.065 | 2721.42 |
| 0.067 | 2805.156 |
| 0.069 | 2888.892 |
| 0.070 | 2930.76 |
| 0.071 | 2972.628 |
| 0.078 | 3265.704 |
| 0.080 | 3349.44 |
| 0.081 | 3391.308 |
| 0.082 | 3433.176 |
| 0.095 | 3977.46 |
| 0.096 | 4019.328 |
| 0.102 | 4270.536 |
| 0.104 | 4354.272 |
| 0.105 | 4396.14 |
| 0.127 | 5317.236 |
| 0.144 | 6028.992 |
| 0.148 | 6196.464 |
| 0.149 | 6238.332 |
| 0.184 | 7703.712 |

In some embodiments, the heat transfer value rates (h and $h_{CT}$) may be from about 0.024 to about 0.15, about 0.026 to about 0.10, or about 0.026 to about 0.075 cal/s·cm²·° C.

Figure 9:
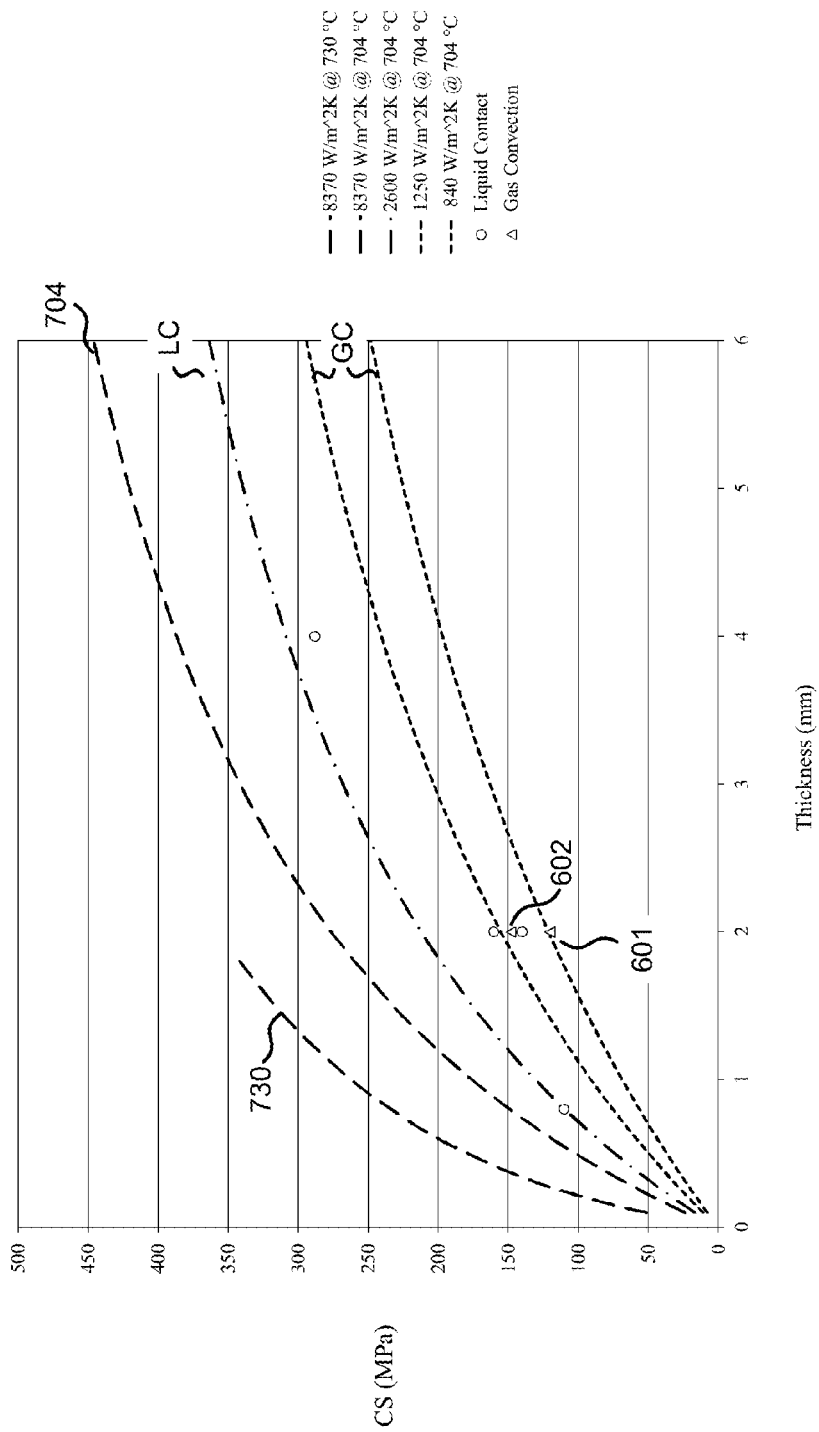
FIG. 9 is a graph of MPa of surface compression of a glass sheet as a function of thickness t of the sheet in millimeters, showing regions of performance newly opened by one or more embodiments of the apparatuses and methods of the present disclosure.

FIG. 9 shows the newly opened performance space in MPa of surface compression of a glass sheet as a function of thickness t (in mm), by a graph of C(h,t)·Ψ(SLG) for selected values of h according to equations 6-9 above, with Ψ(SLG) corresponding to the value of Ψ for SLG in Table III. The traces labeled GC represent the estimated range of maximum stresses versus thinness of SLG sheets achievable by gas convective tempering, from 0.02 cal/s·cm²·° C. (or 840 W/m²K) to 0.03 cal/s·cm²·° C. or 1250 W/m²K, assuming that these levels of heat transfer coefficient can be employed in that process at a heated glass viscosity of $10^{8.2}$ Poises or about 704° C., a temperature above the capability of convective gas processes.

Examples of highest reported sheet CS values based on gas convective tempering processes are shown by the triangle markers labeled Gas in the legend. The value 601 represents advertised product performance capability of commercial equipment, while the value 602 is based on an oral report at a glass processing conference. The trace labeled LC represents the curve of maximum stresses versus thinness of SLG sheets estimated to be achievable by liquid contact tempering, given by a heat transfer rate h of 0.0625 cal/s·cm²·° C. (or about 2600 W/m²K), also assuming processing at an initial heated glass viscosity of $10^{8.2}$ Poises or about 704° C. Examples of highest reported sheet CS values based on liquid contact tempering processes are shown by the circle markers labeled Liquid in the legend. The higher of the two values at 2 mm thickness is based on a report of tempering of a borosilicate glass sheet, and the stress achieved has been scaled for the figure by $(\Psi_{SLG})/(\Psi_{borosilicate})$ for scaled direct comparison.

The trace labeled 704 represents stresses achievable by one or more embodiments of the presently disclosed methods and apparatuses at a heat transfer rate of 0.20 cal/s·cm²·° C. (or about 8370 W/m²K) and an initial temperature, just before quenching, of 704° C. The level of stress on the glass sheet thus achievable represents almost the same scope of improvement over liquid tempering strength levels as liquid tempering represents over state of the art gas convective tempering. But the 704 boundary is not an upper limit—embodiments have been shown to be viable above this value due to the good control of form and flatness achievable in a small-gap gas bearing thermal strengthening at even higher temperatures (at lower viscosities of the glass). The trace labeled 730 shows some of the additional strengthening performance achieved by a heat transfer rate of 0.20 cal/s·cm²·° C. (or about 8370 W/m²K) at a starting temperature for a SLG sheet of 730° C., very near or above the softening point of the glass. Significant improvements in compressive stress and thus in glass sheet strength are thus achieved particularly by the combination of high heat transfer rate and the use of high initial temperatures enabled by the good handling and control of sheet flatness and form in a tight gas bearing—and the improvements are particularly striking at thickness 2 mm and below.

Figure 10:
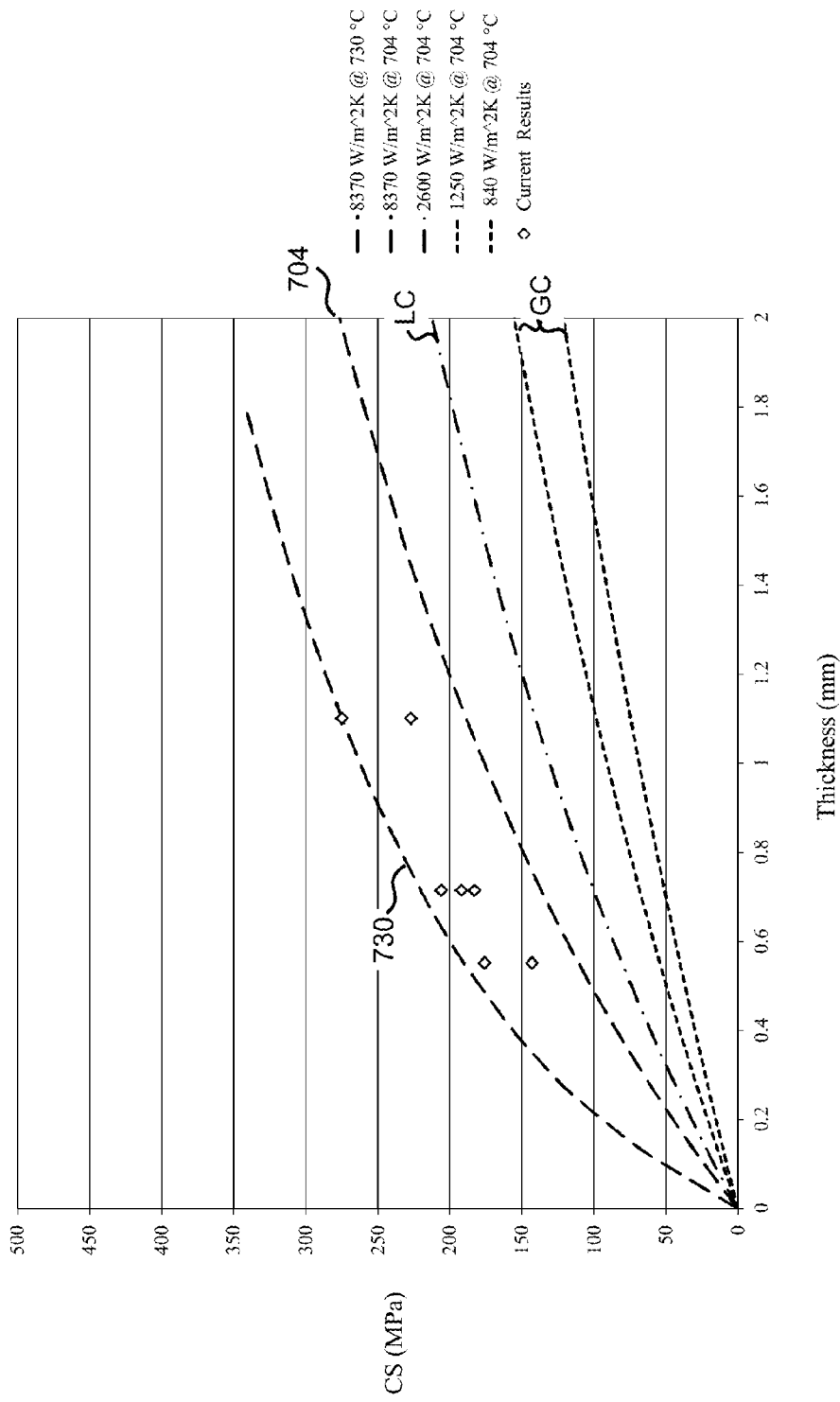
FIG. 10 is a graph showing compressive stress as a function of thickness plotted for selected examples of tempered glass sheets of the present disclosure.

FIG. 10 shows the traces of FIG. 9 explained above, at 2 mm and below, but with compressive stress as a function of thickness plotted for selected examples of tempered glass sheets produced by one or more embodiments of the present disclosure, showing the extreme combination of thermal strengthening levels and thinness enabled by the present disclosure.

In another embodiment, thermally strengthened glass sheet disclosed herein has both high thermal stresses and low, as-formed surface roughness. The processes and methods disclosed herein can thermally strengthen a sheet of glass without increasing the surface roughness of the as-formed surfaces. For example, incoming float glass air-side surfaces, and incoming fusion formed glass surfaces, were characterized by atomic force microscopy (AFM) before and after processing. $R_a$ surface roughness was less than 1 nm (0.6-0.7 nm) for incoming 1.1 mm soda lime float glass and was not increased by thermal strengthening according to the present processes. Similarly, a $R_a$ surface roughness of less than 0.3 nm (0.2-0.3) for 1.1 mm sheets of fusion formed glass was maintained by thermal strengthening according to this disclosure. Accordingly, thermally strengthened glass sheets have a surface roughness on a least a first surface in the range of from 0.2 to 1.5 nm $R_a$ roughness, 0.2 to 0.7 nm, 0.2 to 0.4 or even such as 0.2 to 0.3 nm, over at least an area of 10×10 μm. Surface roughness may be measured over an area of 10×10 μm in exemplary embodiments, or in some embodiments, 15×15 μm.

In some embodiments, the glass sheet has one or more coatings that are placed on the glass prior to the thermal strengthening of the glass sheet. The processes herein can be used to produce a strengthened glass sheets having one or more coatings, wherein the coating is placed on the glass prior to thermal strengthening and is unaffected by the process. Specific coatings that are advantageously preserved on glass sheets of the present disclosure include low E coatings, reflective coatings, antireflective coatings, anti-fingerprint coatings, cut-off filters, pyrolytic coatings, etc.

In another embodiment, the thermally strengthened glass sheets described herein have high flatness. Controlled gas bearings are preferably used in transporting and heating, and in some embodiments, can be used to assist in controlling and/or improving the flatness of the glass sheet, resulting in higher degree of flatness than previously obtainable, particularly for thin and/or highly strengthened sheets. For example, sheets at least 0.6 mm can be strengthened with improved post-strengthening flatness. The flatness of thermally strengthened glass sheets embodied herein can comprise 100 μm or less total indicator run-out (TIR) along any 50 mm length along one of the first or second surfaces thereof, 300 μm TIR or less within a 50 mm length on one of the first or second surfaces, 200 μm TIR or less, 100 μm TIR or less, or 70 μm TIR or less within a 50 mm length on one of the first or second surfaces. In exemplary embodiments, flatness is measured along any 50 mm or less profile of the glass sheet. In contemplated embodiments, sheets with thickness disclosed herein have flatness 200 μm TIR or less within a 20 mm length on one of the first or second surfaces, such as flatness 100 μm TIR or less, flatness 70 μm TIR or less, flatness 50 μm TIR or less.

Embodiments of the methods and apparatuses have been applied to glass sheets having thickness ranging from 0.1 mm to 5.7 or 6.0 mm, including, in addition to the end point values, 0.2 mm, 0.28 mm, 0.4 mm, 0.5 mm, 0.55 mm, 0.7 mm, 1 mm, 1.1 mm, 1.5 mm, 1.8 mm, 2 mm, and 3.2 mm. Contemplated embodiments include thermally strengthened glass sheets having thicknesses in ranges from 0.1 to 20 mm, from 0.1 to 16 mm, from 0.1 to 12 mm, from 0.1 to 8 mm, from 0.1 to 6 mm, from 0.1 to 4 mm, from 0.1 to 3 mm, from 0.1 to 2 mm, from 0.1 to less than 2 mm, from 0.1 to 1.5 mm, from 0.1 to 1 mm, from 0.1 to 0.7 mm, from 0.1 to 0.5 mm and from 0.1 to 0.3 mm.

In some embodiments, thermally strengthened glass sheets have high aspect ratios—i.e., the length and width to thickness ratio is large. Because the processes used don't rely on high pressures or large volumes of air, flatness can be maintained during the process by the use of gas bearings and high aspect ratio glass sheets (i.e., glass sheets with high ratio of length to thickness, or of width to thickness) can be thermally strengthened while retaining the desired or necessary shape. Specifically, sheets with length to thickness and/or width to thickness ratios ("aspect ratios") of approximately at least 10:1, at least 20:1, and up to and over 1000:1 can be strengthened. In contemplated embodiments, sheets with aspect ratios of at least 200:1, at least 500:1, at least 1000:1, at least 2000:1, at least 4000:1 can be processed.

Another aspect comprises thermally strengthened low coefficient of thermal expansion (CTE) glass sheets. As noted above, thermal strengthening effects are significantly dependent upon the CTE of the glass of which the glass sheet is comprised. However, thermal strengthening of low CTE glasses may provide strengthened glass compositions having advantageous properties, such as increased chemical resistance, or better compatibility with electronic devices due to low alkali content. Glass sheets having CTEs of 65, 60, 55, 50, 45, 40, and even $35 \times 10^{-6}$ °C.$^{-1}$ and below are capable of safety-glass like break patterns ("dicing") at thicknesses of less than 4 mm, less than 3.5 mm, less than 3 mm, and even at 2 mm or less. Glasses having CTE values of $40 \times 10^{-6}$ °C.$^{-1}$ and below can be strengthened using the processes described herein. Such glasses can have similar surface compressions to SLG sheets strengthened by convention commercial (gas convective) processes at the same thickness. In some embodiments, the compressive stress of low CTE glasses can comprise at least 50 MPa, at least 100 MPa, at least 125 MPa, at least 150 MPa, at least 200 MPa, at least 250 MPa, at least 300 MPa, or at least 400 MPa for glass sheets having a thickness of no more than 1 cm, no more than 5 mm, no more than 3 mm, no more 2 mm, no more than 1.5 mm, no more than 1 mm, no more than 0.75 mm, no more than 0.5 mm, no more than 0.3 mm, no more than 0.2 mm, or no more than 0.1 mm.

Glass sheets formed according to the present disclosure have a multitude of applications, for example in electronic devices, displays and in laminates, such as glass-interlayer-glass laminates used in automotive glass sidelights. Stronger and thinner laminates can be produced, resulting in weight and cost savings and fuel efficiency increases. Desirably, a thermally strengthened thin sheet may be cold bent and laminated to a formed thicker glass, providing an easy and reliable manufacturing process not requiring any hot forming of the thin sheet.

Process

In one aspect, an overall process for strengthening a glass sheet comprises supporting or guiding at least a portion of a glass sheet having a transition temperature, on a first surface, at least in part by a flow or a pressure of a gas delivered to a gap between the first surface and a first heat sink, the sheet temperature being above the transition temperature of the glass, and then cooling the glass sheet by thermal conduction more than by convection. Conduction is a process of heat transfer where energy is transmitted through interactions between adjacent molecules, while convection is a process of heat transfer where energy is communicated via motion of a fluid (e.g., air, helium, etc.), such as where heated fluid moves away from a heat source and is replaced by cooler fluid. In at least some embodiments, the terms "glass ceramic" or "ceramic" can be substituted and/or equally applied where the term "glass" is used.

In some embodiments, an overall process for strengthening a glass sheet comprises heating a glass sheet in a hot zone and then cooling the glass sheet. The glass sheet has a transition temperature, which occurs is where the viscosity of the glass has a value of $\eta=10^{12}-10^{13.3}$ Poise. The glass is heated sufficiently to bring the glass sheet above the transition temperature. Optionally, the glass can be transitioned from the hot zone to a cool zone through a transition zone. The surfaces of the glass sheet are positioned adjacent to heat sinks, one on either glass surface with a gap in between the glass surface and the heat sink. Gas is delivered into the gaps through multiple apertures in the heat sinks. The glass sheet is cooled by conduction more than by convection and sufficiently to fix or create a thermally induced surface compression and a thermally induced central tension of the sheet.

An apparatus for enabling the processes described can include a heating zone for heating a glass sheet to a temperature above the transition temperature and a cooling zone for cooling the heated glass sheet from to provide a strengthened glass sheet. The apparatus can include an optional transition zone between the heating zone and the cooling zone. The cooling zone can comprise a pair of gas bearings disposed on opposite sides of a gap, which can be configured to deliver a gas to the gap to cool the heated glass sheet by conduction more than by convection. In some embodiments, the gas bearings can include a plurality of apertures for delivering the gas to the gap, and gas bearing surfaces that provide heat sinks capable of conducting heat away from the heated glass sheet by conduction more than by convection.

One embodiment of a method according to this disclosure is illustrated in the flow chart of FIG. 11. The method or process 100 includes the step 160 of supporting a glass sheet at least in part by a gas (through gas flow and pressure as in some convective gas strengthening processes). The sheet can be heated to above the its glass transition temperature while at the same time cooling the sheet: 1) by conduction more than by convection through the gas to a heat sink, and 2) sufficiently to create or fix a thermally-induced surface compression stress and a thermally-induced central tension stress, of the sheet when at ambient temperature.

According to a variation on the embodiment of FIG. 11, depicted as method 100' in the flow chart of FIG. 12, the method can include the step 110 of heating a glass sheet sufficiently such that the sheet is above a transition temperature of the glass. In step 130A the method further includes positioning a first sheet surface facing a first heat sink surface across a first gap and, in step 130B, positioning the second sheet surface facing a second heat sink surface across a second gap, the second heat sink surface. The heat sink surfaces can include apertures and/or can be porous. The method 100 can further include, in step 160, cooling the sheet, by conduction more than by convection through a gas to the respective heat sink surfaces, sufficiently to strengthen the glass, that is, sufficiently to create or fix in the sheet a thermally-induced surface compression stress and a thermally-induced central tension stress. The step 160 of cooling the sheet also can include delivering the gas to the first and second gaps through the apertures or porous heat sink. In some embodiments, the gas is delivered only through the apertures of the heat sink or only through the pores or pores and aperatures of the porous heat sink.

These and other related methods of this disclosure go against the currently dominant technique of gas-convection-cooling by using conduction as the dominant mode of cooling, instead of convection. Instead of a solid-to-gas (glass to air) heat exchange, methods described herein incorporate a solid-to-solid (glass to heat sink) heat exchange, mediated across a small gap by a small amount of gas, both to begin and to complete the cooling that produces thermal strengthening. Although some convection is present as the mediating gas flows into the small gap, warms, and leaves, conduction directly across the gap through the gas and into the heat sink is the principal mode of cooling. Unlike the solid and liquid cooling methods described above, the conduction is mediated through a gas barrier layer. The use of a gas as an intermediate conductor, without contact of the sheet by liquid or solid matter, can preserve the surface quality of the processed articles by avoiding contact other than by a gas. This can avoid the introduction of unwanted distortions, spatial variation in strengthening and contamination of the glass surfaces seen in liquid and solid cooling. The embodiments disclosed herein provide a unique, non-contact, conductive quench that allows for very high cooling rates that were not previously available in the art of thermal tempering.

Because conduction, ultimately solid-to-solid, allows for more rapid heat flow than convection, the cooling rate increases needed for thinner glass sheets are not tied to gas velocity and volume. Gas flow and gap size can, instead, be optimized for other purposes, according to various embodiments and variations of the methods and apparatuses of the present disclosure, such as for stiffness of the gas cushion in the gap, supporting or for flattening and/or otherwise shaping a sheet, optimizing heat conduction, or simply maintaining sheet flatness and/or shape during thermal strengthening, as well as balancing ease of sheet handling with high cooling rates, for example. For example, helium becomes an economically viable alternative at low flow rates, and offers thermal conductivity about five times that of air.

Decreasing the volumes of air flowing over a glass sheet during cooling decreases the potential risk of deformation of hot thin sheets by the high speed, high volume air flows otherwise required for strengthening thin sheets, and allows softer, higher temperature sheets to be handled with no or minimal distortion, further improving the achievable degree of strengthening. Eliminating high air flow rates also eases problems sometimes seen in transporting the sheet into the quenching chamber (moving against the high air flow), and in keeping the high-flow cooler air from entering into and cooling the nearer parts of the furnace used to heat the sheet.

Figure 13A:
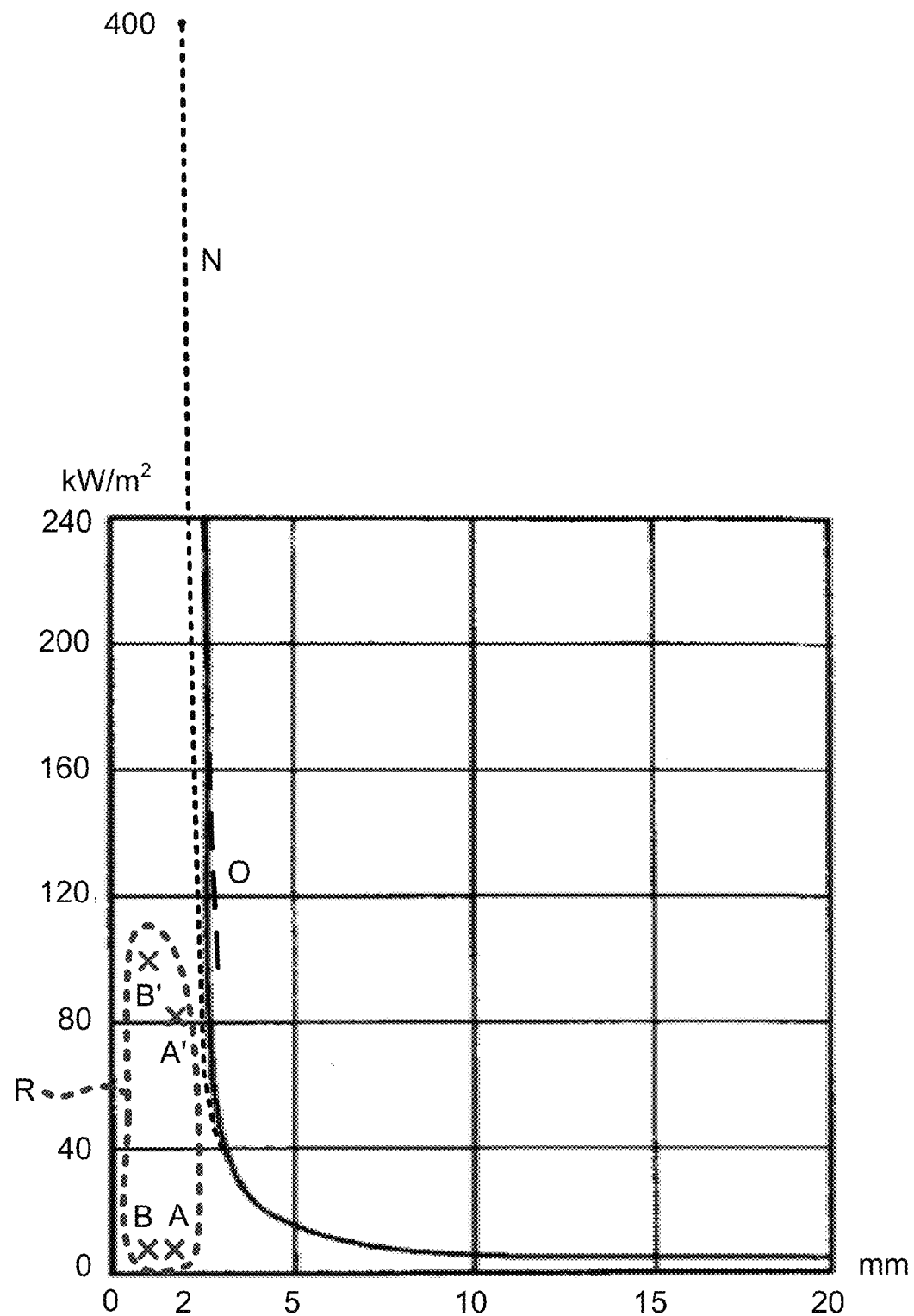
FIG. 13A is the graph of FIG. 3 with a region R and points A, B, A' and B' marked thereon to show a region in which the methods and methods and apparatuses and processes of the present disclosure allow operation, in contrast to the prior art.
Figure 13B:
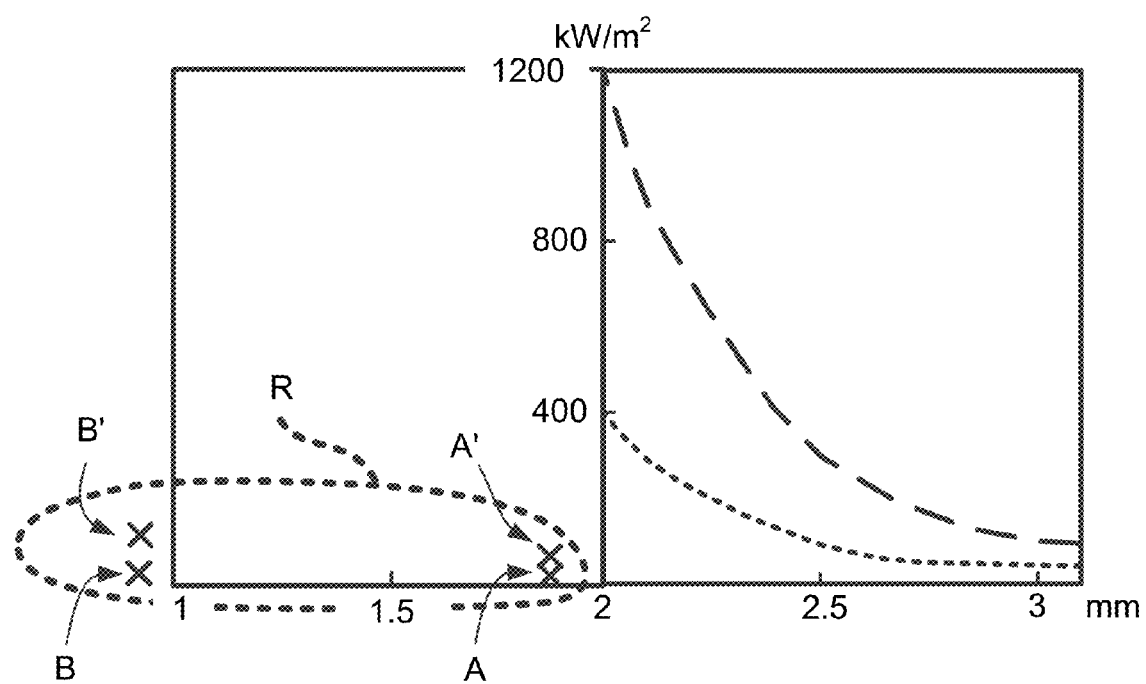
FIG. 13B is another representation of the region R and points A, B, A' and B' of FIG. 13A, but shown adjacent to (and positioned relative to the scale) of a reduced size copy of FIG. 2.

Another advantage in the avoiding high air flow rates lies in the power and energy savings achieved by using low gas flows and solid-gas-solid conduction. Points A and B of FIGS. 13A and 13B represent a high-end estimate of peak power use, per square meter of glass sheet, by a compressed air supply at relatively high flow. Practical low-end peak power use of compressed air could be as little as $\frac{1}{16}$ of the values shown. Points A and B do not include active cooling of the heat sink, however, which can be included in some embodiments, especially where a machine is in continuous, quasi-continuous or high frequency operation.

Referring again to FIGS. 13A and 13B, points A' and B' represent the conservatively estimated peak power levels for operation at points A and B when active cooling of the heat sink surfaces is factored in, assuming the thermal load equivalent of a 300° C. drop in glass sheet temperature is accomplished by an active cooling system having a thermal-to-mechanical (or electrical) efficiency ratio of 7.5 to 1, within a time limit of 2.1 seconds for point A' and within 1 second for point B'. (These points correspond approximately to glass sheets actually tempered in the experimental apparatus described herein.) Although the four points within region R of FIGS. 13A and 13B illustrate to some degree the significance of the improvement obtainable by the methods and apparatuses of the present disclosure, it should be noted that the full benefits are likely significantly understated in the figures, because power demand is the quantity represented. For example, peak power of air blowers, as represented by the curve N, is not efficiently turned on and off, typically requiring gated airways to block off large fans, which still rotate (but at reduced load), when air is not needed. Peak power demands of fluid cooling systems such as chilled water plants, represented by the points A' and B' as examples easily achievable according to the present disclosure, can generally be much more efficiently accommodated, and effective peak power would be significantly lower, approaching A' and B' only as fully continuous operation is approached. Thus, the difference in total energy demands would tend to be greater than the difference for peak power demand, which is represented in the figure. In some embodiments, the processes described herein have peak powers of less than 120 KW/m², less than 100 KW/m², less than 80 KW/m² to thermally strengthen a glass sheet of 2 mm thickness or less.

The amount of conduction at conditions embodied in processes using apparatuses described herein can be determined via the following. First, in the context of thermal strengthening by conduction as in the present disclosure, the thermal conductivity of the gas must be evaluated in the direction of conduction, which is along a thermal slope. Air at high temperature, at or near the surface of the sheet to be (or being) cooled, has significantly higher thermal conductivity than air at a lower temperature such as air at or near room temperature (the nominal thermal conductivity of (dry) room temperature air (25° C.) is approximately 0.026 W/m·K), at or near the surface of the heat sink. An approximation that assumes air over the whole gap to be at the average temperature of the two facing surfaces, at the start of cooling is used. A glass sheet may be at a temperature of 670° C., for example, while the heat sink surface may start at 30° C., for example. Accordingly, the average temperature of the air in the gap would be 350° C., at which dry air has a thermal conductivity of about 0.047 W/m·K; more than 75% higher than its thermal conductivity at room temperature and sufficiently high to conduct large amounts of heat energy through gaps of practical size as discussed below.

To illustrate, $Q_{cond}$, the conductive component of the rate of heat transfer through a gap of distance g which gap has an area $A_g$ (in a direction everywhere perpendicular to the direction of the gap distance g) may be given by:

$$Q_{cond} = \frac{A_g k (T_S - T_{HS})}{g} \quad (13)$$

where k is the thermal conductivity of the material (gas) in the gap evaluated in the direction of (or opposite of) heat conduction, $T_S$ is the temperature of the glass surface and $T_{HS}$ is the temperature of the heat sink surface (or the heat source surface, for other embodiments). As mentioned above, to evaluate k rigorously would require integrating the thermal conductivity of the gas along (or against) the direction of conductive heat flow, as the thermal conductivity of the gas varies with temperature—but to good approximation, k may be taken as the value of k for the gas in the gap when at the average of the temperatures of the two surfaces, $T_S$ and $T_{HS}$.

Reframing equation (13) in units of heat transfer coefficient (units of heat flow power per meter squared per degree Kelvin) gives:

$$\frac{Q_{cond}}{A_g (T_S - T_{HS})} = \frac{k}{g} \quad (14)$$

so the effective heat transfer coefficient for conduction across the gap is the thermal conductivity of the medium in the gap (air in this case) (in units of W/mK) divided by the length of the gap (in meters), giving a value of Watts per meter squared per degree of temperature difference.

Figure 14:
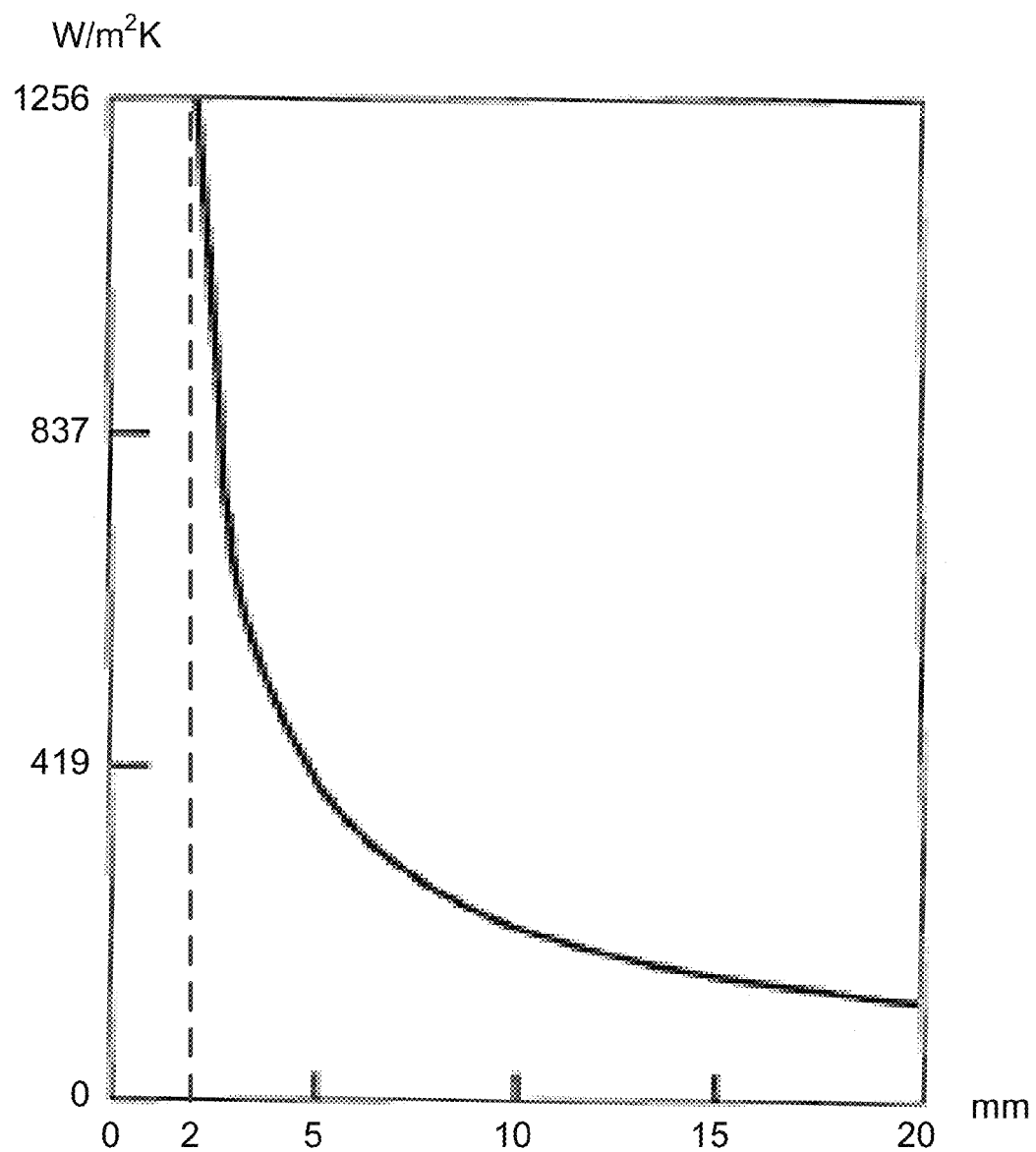
FIG. 14 (Prior Art) is a graph of the required heat transfer coefficient needed for tempering as a function of glass thickness.

Table IV shows the heat transfer coefficients (k/g), due to conduction alone, for air and helium filled gaps, from 10 μm up to 200 μm in steps of 10 μm each. FIG. 14 (Prior Art) shows an industry-standard curve from about 35 years ago (with reference line at 2 mm added) showing the heat transfer coefficient required to fully temper a sheet of glass, as a function of thickness in mm, under certain assumed conditions. As may be seen from a comparison of Table IV with FIG. 14, an air-filled gap of approximately 40 μm can allow full tempering of 2 mm thick glass by conduction. Using helium (or hydrogen, with similar thermal conductivity) as the gas, a gap of about 200 μm can be used to fully temper 2 mm thick glass.

TABLE IV

| Air | | | Helium | | |
|---|---|---|---|---|---|
| conductivity (W/m/K) | 0.047 | | conductivity (W/m/K) | 0.253 | |
| | heat trans coeff. | | | heat trans coeff. | |
| Gap (m) | W/m²/K | cal/s/cm² | Gap (m) | W/m²/K | cal/s/cm² |
| 0.00001 | 4700 | 0.11226 | 0.00001 | 25300 | 0.604291 |
| 0.00002 | 2350 | 0.05613 | 0.00002 | 12650 | 0.302145 |
| 0.00003 | 1566.67 | 0.03742 | 0.00003 | 8433.33 | 0.20143 |
| 0.00004 | 1175 | 0.028065 | 0.00004 | 6325 | 0.151073 |
| 0.00005 | 940 | 0.022452 | 0.00005 | 5060 | 0.120858 |
| 0.00006 | 783.333 | 0.01871 | 0.00006 | 4216.67 | 0.100715 |
| 0.00007 | 671.429 | 0.016037 | 0.00007 | 3614.29 | 0.086327 |
| 0.00008 | 587.5 | 0.014032 | 0.00008 | 3162.5 | 0.075536 |
| 0.00009 | 522.222 | 0.012473 | 0.00009 | 2811.11 | 0.067143 |
| 0.0001 | 470 | 0.011226 | 0.0001 | 2530 | 0.060429 |
| 0.00011 | 427.273 | 0.010205 | 0.00011 | 2300 | 0.054936 |
| 0.00012 | 391.667 | 0.009355 | 0.00012 | 2108.33 | 0.050358 |
| 0.00013 | 361.538 | 0.008635 | 0.00013 | 1946.15 | 0.046484 |
| 0.00014 | 335.714 | 0.008019 | 0.00014 | 1807.14 | 0.043164 |
| 0.00015 | 313.333 | 0.007484 | 0.00015 | 1686.67 | 0.040286 |
| 0.00016 | 293.75 | 0.007016 | 0.00016 | 1581.25 | 0.037768 |
| 0.00017 | 276.471 | 0.006604 | 0.00017 | 1488.24 | 0.035547 |
| 0.00018 | 261.111 | 0.006237 | 0.00018 | 1405.56 | 0.033572 |
| 0.00019 | 247.368 | 0.005908 | 0.00019 | 1331.58 | 0.031805 |
| 0.0002 | 235 | 0.005613 | 0.0002 | 1265 | 0.030215 |

Using helium or hydrogen as the gas allows for a gap size about 5 times larger for the same heat transfer coefficient. In other words, using helium or hydrogen as the gas in the gap increases the heat transfer coefficient available for quenching by about 5 times at the same gap size.

In addition to cooling through a gas by conduction more than by convection, another embodiment includes heating (or heating and/or cooling) through a gas by conduction more than by convection. Regarding the relative contributions of conduction and convection, whether for heating or cooling, the convective $Q_{conv}$ component of the rate heat transfer across the gap (or gaps) may be given by:

$$Q_{conv} = e\dot{m} C_p \left( \frac{T_S + T_{HS}}{2} - T_i \right) \quad (15)$$

where in is the mass flow rate of the gas, Cp is the specific heat capacity of the gas, $T_i$ is the inlet temperature of the gas as it flows into the gap, and e is the effectiveness of the heat exchange between the gas flowing in the gap and the sheet surface and the surface of the heat sink/source (the "walls" of the gap). The value of e varies from 0 (representing zero surface-to-gas heat exchange) to 1 (representing the gas fully reaching the temperature of the surfaces). The value of e can be computed by those skilled in the art of heat transfer using, for example, the e-NTU method.

Typically however, if the gap between the surface of the sheet and the surface of the heat sink/source is small, the value of e will be very nearly equal to 1, meaning the gas heats nearly completely—to equal, on average, the average of the temperature of the two surfaces on either side—before it leaves the gap. Assuming e=1 (a slight overestimate of the rate of convective heat transfer), and the gas being supplied to the gap through the surface of the heat sink/source, it can be assumed that the initial temperature of the gas in the gap is the same as the temperature of the surface of the heat sink/source ($T_i = T_{HS}$). The rate of heat transfer due to convection may then be simplified to:

$$Q_{conv} = \dot{m}C_p\left(\frac{T_S + T_{HS}}{2}\right) \quad (16)$$

To cool (or heat, assuming the amount of radiation from the heat source when heating is not too high) the sheet principally by conduction, in the area of the gap, thus requires that:

$$Q_{cond} > Q_{conv} \quad (17)$$

Combining (17) with equations (13) and (16) gives the following conditional:

$$\frac{k}{g} > \frac{\dot{m}C_p}{2A_g} \quad (18)$$

which, when held, will essentially ensure that the sheet, in the area of the gap at issue, is cooled (or heated) principally by conduction. Accordingly, the mass flow rate $\dot{m}$ of the gas should be less than $2kA_g/gC_p$, or $2k/gC_p$ per square meter of gap area. In an embodiment, $\dot{m} < B \cdot (2kA_g/gC_p)$, where B is the ratio of convective cooling to conductive cooling. As used herein, B is a positive constant less than one and greater than zero. This ratio of convective cooling to conductive cooling can be any value from less than one to $1 \times 10^{-8}$. In some embodiments, B is less than 0.9, 0.8, 0.7, 0.6, 0.5, 0.4, 0.1, $5 \times 10^{-2}$, $1 \times 10^{-2}$, $5 \times 10^{-3}$, $1 \times 10^{-3}$, $5 \times 10^{-4}$, $1 \times 10^{-4}$, $5 \times 10^{-5}$, $1 \times 10^{-5}$, $5 \times 10^{-6}$, $1 \times 10^{-6}$, $5 \times 10^{-7}$, $1 \times 10^{-7}$, $5 \times 10^{-8}$, or $1 \times 10^{-8}$. In some embodiments, $\dot{m}$ is minimized, consistent with the needs of using the gas flow to support and control the sheet position relative to the heat sink surface(s) Inn other embodiments, m should be selected to control the position of the heat exchange surfaces themselves, relative to the sheet.

Figure 15:
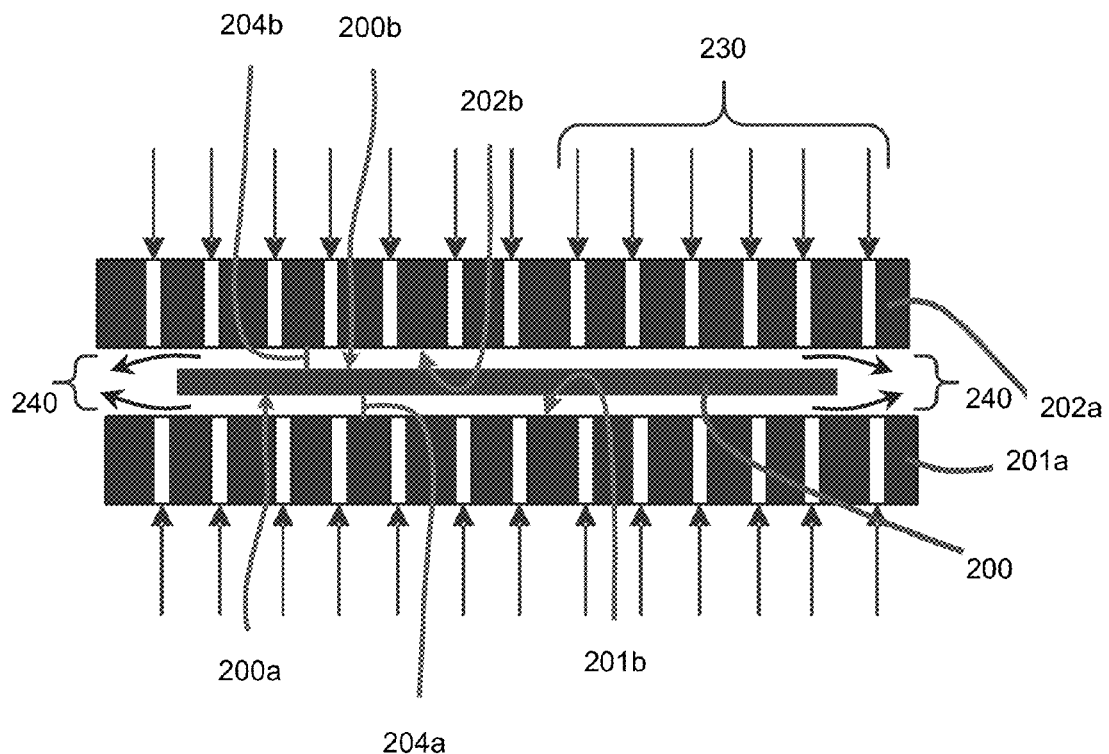
FIG. 15 is a diagrammatic cross-section of a glass sheet being cooled by conduction more than by convection, according to the present disclosure.

A diagrammatic cross-section of a glass sheet being cooled by conduction more than by convection is shown in FIG. 15. A hot glass sheet 200 has its first and second (major) surfaces 200a, 200b each facing a respective first and second surface 201b, 202b of respective first and second heat sinks 201a, 202a across respective gaps 204a and 204b. Gas 230 is fed through the first and second surfaces 201b, 202b as represented by the arrows, to supply the gaps 204a, 204b, and to assist in keeping the glass sheet centered or otherwise positioned between the heat sinks 201a, 202a. The air or other gas may leave passing by the edges of the heat sinks 201a, 202a as shown by arrows 240. By choosing the size of the gaps 204a, 204b and the gas and the flow rate of the gas 230 in accordance with the preceding paragraph and other discussion above, the glass sheet 200 will be cooled more by conduction than convection.

In some embodiments, the gaps 204a, 204b are configured to have a thickness or distance across the gap sufficient such that the heated glass sheet is cooled by conduction more than by convention. In some embodiments, gaps 204a and 204b may have a thicknesses of about 100 μm or greater (e.g., in the ranges from about 100 μm to about 200 μm, from about 100 μm to about 190 μm, from about 100 μm to about 180 μm, from about 100 μm to about 170 μm, from about 100 μm to about 160 μm, from about 100 μm to about 150 μm, from about 110 μm to about 200 μm, from about 120 μm to about 200 μm, from about 130 μm to about 200 μm, or from about 140 μm to about 200 μm). In other embodiments, gaps 204a and 204b may have a thicknesses of about 100 μm or less (e.g., in the ranges from about 10 μm to about 100 μm, from about 20 μm to about 100 μm, from about 30 μm to about 100 μm, from about 40 μm to about 100 μm, from about 10 μm to about 90 μm, from about 10 μm to about 80 μm, from about 10 μm to about 70 μm, from about 10 μm to about 60 μm, or from about 10 μm to about 50 μm).

Heat sinks 201a, 202a may comprise solid or porous configurations. Suitable materials, include, but are not limited to aluminum, bronze, carbon or graphite, stainless steel, etc. Heat sink dimensions may be designed to be sufficient to address the size of the glass sheet and to efficiently and effectively transfer heat without changing the heat sink temperature significantly. In the case where heat sinks 201a and/or 202a are porous, they may still include additional apertures or holes for flowing gas or may use the porous structure to provide flow, or both. In some embodiments, the heat sinks further comprise passages to allow fluid flow for controlling the temperature of the heat sink, described in more detail in FIGS. 17A-17C and below.

Eliminating high gas flow rates of the prior art may enable use of very small apertures or pores in the heat sink face to provide the gas within the gap(s). In some embodiments, apertures may be less than 2 mm, less than 1.5 mm, less than 1 mm, less than 0.5 mm, less than 0.25 mm, or less than or equal to 200, 150, 100, 50, 30, 20, or 10 μm, when measured in the smallest direction (e.g., diameter). In some embodiments, the apertures are from about 10 μm to about 1 mm, about 20 μm to about 1 mm, or about 50 μm to about 1 mm. Aperture spacing can be from about 10 μm to about 3 mm, about 20 μm to about 2 mm, or about 50 μm to about 1 mm, measured edge-to-edge of apertures. Small apertures or pores may function as individual flow restrictors, providing high-performance gas-bearing-type dynamics, such as high levels of stiffness and consistency of support of the sheet to position the sheet and control gap size, allowing for high homogeneity of thermal strengthening effects to avoid or reduce stress birefringence. Further, because very small pores or apertures may be used, the relative amount of solid matter at the surface of the heat sink facing the sheet surface across the gap(s) can be maximized, thereby increasing conductive heat flow. According to one embodiment, use of such apertures as the only path for providing gas to the gap(s) and configuring the apertures to lie in directions close to normal to the heat sink surface can optimize gas-bearing-type dynamics, because the flow from the apertures may not be compromised by gas flows from, for example, additional larger apertures, from sources other than through the heat sink surface(s) adjacent to the sheet, or by other lateral flow.

Figures 16, 17A:
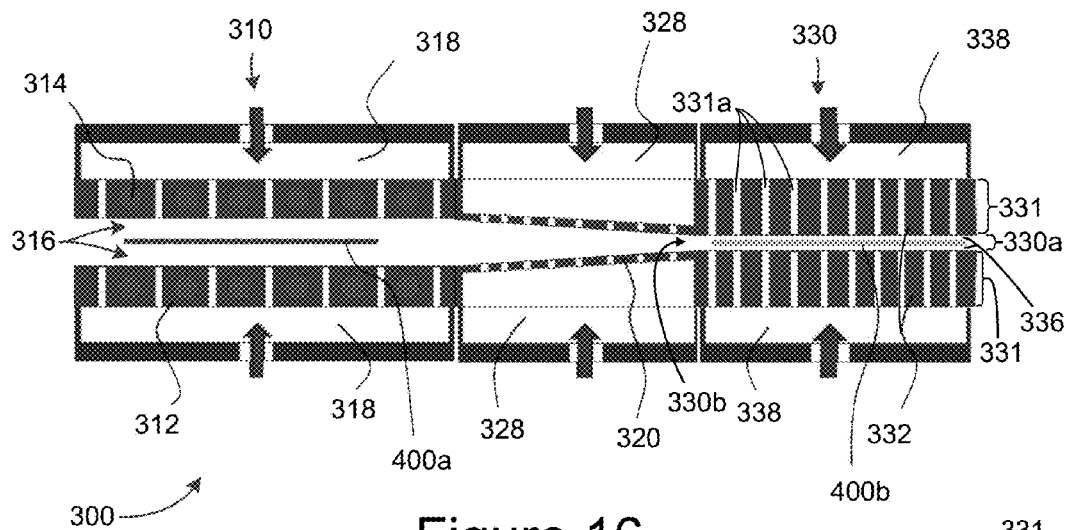
FIG. 16 is a schematic cross-sectional diagram of an experimental apparatus according to the present disclosure.
FIG. 17A is a perspective cut-away view of another embodiment of an apparatus similar to that of FIG. 16.

FIGS. 16 and 17A-17C show an exemplary embodiment of an apparatus 300 according to this disclosure. FIG. 16 show a schematic cross-sectional diagram of the apparatus 300 in which a glass sheet can be cooled through a gas into a conductive heat sink. The apparatus of includes a hot zone 310, a cold zone 330, and a transition gas bearing 320, by which a glass article may be moved from the hot zone 310 to the cold zone 330 such that no contact or substantially no contact occurs between the glass and the bearings. The hot zone 310 has gas bearings 312 each fed from a hot zone plenum 318, the bearings 312 having cartridge heaters 314 inserted into holes through the bearings 312, which serve to heat the hot zone gas bearings 312 up to a desired starting process temperature. A glass sheet (hot zone) 400a is kept between the hot zone gas bearings 312 for a duration long enough to bring it to a desired pre-cooling temperature.

In some embodiments, heating the sheet in the hot zone may be done predominantly via conduction of heat from a heat sink through a thin gas barrier. The conductive heating processes used in the hot zone can be similar to, but the reverse of—i.e., pushing heat into the glass sheet—the cooling processes described above.

In some embodiments gaps 316 between the hot zone gas bearings 312 and the glass sheet 400a may be relatively large, on the order of 0.05" (1.27 mm) to 0.125" (3.175 mm) or greater, since the glass sheet 400a may be heated up relatively slowly and thermal radiation from the hot gas bearings 312 into the glass sheet 400a is adequate for this purpose. In other embodiments, hot zone gap values may be as small as 150 microns per side or 500 microns per side. Smaller gaps may be advantageous because they enable the bearings to have better "stiffness"—i.e., ability to centralize the glass and therefore flatten it while it is in its softened state. In some embodiments, the process may re-form the glass sheets—flattening them—in the initial heating step. In some embodiments, the top and bottom hot zone bearings may be on actuators, allowing for changing the gap width in a continuous manner or, alternatively, allowing the glass to be brought into the hot zone when the gap is large and then compressing the gap to flattening the glass while it is still soft.

Process temperatures are dependent on a number of factors including the glass composition, glass thickness, glass properties (CTE, etc.), and desired level of strengthening. Generally, the starting process temperature may be any value between the glass transition temperature and the Littleton softening point, or in some embodiments, even higher. For SLG, for example, a range process temperature may be from about 640 to about 730° C. or about 690 to about 730° C. In some embodiments, the process temperature range can be from about 620 to about 800° C., about 640 to about 770° C., about 660 to about 750° C., about 680 to about 750° C., about 690 to about 740° C., or about 690 to about 730° C.

The glass sheet 400a is heated to its desired starting process temperature and it can then be moved from the hot zone 310 to the cold zone 330 using any suitable means. In some embodiments, moving the glass sheet 400a from the hot zone 310 to the cold zone 330 may be accomplished by, for example (1) tilting the entire assembly such that gravity acting on the glass sheet forces it to move to the cold zone, (2) blocking off the gas flow from the leftmost exit of the hot zone 310 (the sides are enclosed in this embodiment), thereby forcing all of the gas emanating from all of the gas bearings to exit from the rightmost exit of the cold zone, causing fluid forces to be exerted on the glass sheet 400a and causing it to move to the cold zone 330, or (3) by a combination of (1) and (2)) The transition gas bearings 320 may be supplied with gas by transition bearing plenums 328. The solid material thickness behind the surfaces of the transition gas bearings 320 may be thin and/or of low thermal mass and/or low thermal conductivity, allowing for reduced heat conduction from the hot zone 310 to the cold zone 330, which is fed by separate plenums 338. The transition gas bearings 320 may serve as a thermal break or transition between the two zones 310 and 330 and may serve to transition from the larger gaps 316 of the hot zone down to small gaps 336 of the cold zone 330. Once the glass sheet (cold zone) 400b moves into the cold zone 330 and into the channel 330a, it is stopped from exiting the right side exit by a mechanical stop, not shown. Once the glass sheet 400b cools sufficiently that the center has passed the glass transition (in the case, for example, of 1 mm thick SLG, to below about 490° C., corresponding in this example to about 325° C. at the surface), the stop gate may be removed and the glass sheet 400b may be removed from the apparatus 300. If desired, the glass sheet 400b may be left in the cold zone 330 until somewhere near room temperature before removal.

In the embodiment shown in FIG. 16, the cold zone 330 includes a channel 330a for receiving glass sheet 400b (which is heated to a temperature above the glass transition temperature of the glass sheet in the hot zone) through an opening 330b, conveying the glass sheet 400b, and cooling the glass sheet 400b in the cold zone. In one or more embodiments, the channel 330a includes a conveyance system that may include gas bearings, roller wheels, conveyor belt, or other means to physically transport the glass sheet through the cold zone. Because cooling occurs essentially solid to solid, issues not present in convection-dominated cooling may need to be addressed. For example, for tempering of a large thin sheet, the sheet is may be either (1) introduced quickly into the cold zone, optionally at higher speeds than those typically used in convection-based quenching or (2) the process is operated in a quasi-continuous mode, in which multiple sheets are heated and cooled one after the other in a continuous stream with little space between them, and where the heat sink is actively cooled such that it reaches a thermal equilibrium so that the front and trailing edges of the large sheets have the similar thermal history.

In some embodiments, the cold zone 330 includes one or more heat sinks 331 disposed adjacent to the channel 330a. Where two heat sinks are utilized, such heat sinks may be disposed on opposite sides of the channel 330a, facing each other across a channel gap 330a. In some embodiments, the heat sinks include a plurality of apertures 331a which form part of the gas bearing 332, and the surfaces of the cold gas bearings 332 of the cold zone 330 serve as the two heat sink surfaces. In some embodiments, the heat sinks and/or the surfaces thereof may be segmented. As noted above, in some embodiments, the heat sinks may be porous. In other embodiments, the heat sinks may be porous and the apertures are the pores of the porous heat sinks. The plurality of apertures 332b, a gas source and the channel gap 330a may be in fluid communication. In some embodiments, the gas flows through the apertures 331a to form gas cushions in the channel gap 330a. The gas cushions of some embodiments prevent the glass sheet 400b from contacting the heat sink 331 surfaces. The gas also serves as the gas through which the glass sheet 400b is cooled by conduction more than by convection. In some embodiments, the gas flowed through the apertures cools the heat sinks. In some embodiments, the gas flowed through the apertures both cools the glass by conduction, across the gap into the heat sinks, more than by convention, and cools the heat sinks 331. In some instances, a separate gas or fluid may be used to cool the heat sinks 331. For instance, the heat sinks 331 may include passages 334 for flowing a cooling fluid there through to cool the heat sinks 331, as is more fully described with respect to FIG. 17A. The passages 334 can be enclosed.

Where two heat sinks are used (i.e., a first heat sink and the second heat sink), one or more gas sources may be used to provide a gas to the channel gap 330a. The gas sources may include the same gas as one another or different gases. The channel gap 330a may, therefore, include one gas or a mixture of gases from different gas sources or the same gas source. Exemplary gases include air, nitrogen, carbon dioxide, helium or other noble gases, hydrogen and various combinations thereof. The gas may be described by its thermal conductivity when it enters the channel 330a just before it begins to conductively cool the glass sheet 400b. In some instances, the gas may have a thermal conductivity of about 0.02 W/(m·K) or greater, about 0.025 W/(m·K) or greater, about 0.03 W/(m·K) or greater, about 0.035 W/(m·K) or greater, about 0.04 W/(m·K) or greater about 0.045 W/(m·K) or greater, about 0.05 W/(m·K) or greater, about 0.06 W/(m·K) or greater, about 0.07 W/(m·K) or greater, about 0.08 W/(m·K) or greater, about 0.09 W/(m·K) or greater, about 0.1 W/(m·K) or greater, about 0.15 W/(m·K) or greater, or about 0.2 W/(m·K) or greater).

The processes described allow for high heat transfer rates. Using air as the gas, heat transfer rates as high as 350, 450, 550, 650, 750, 1000, and 1200 kW/m² or more are possible through conduction alone. Using helium or hydrogen, heat transfer rates of 5000 kW/m² or more can be achieved.

The heat sinks 331 of one or more embodiments may be stationary or may be movable to modify the thickness of the channel gap 330a. The thickness of the glass sheet 400b may be in a range from about 0.4 times the thickness to about 0.6 times the thickness of channel gap 300a, which is defined as the distance between the facing surfaces of the heat sinks 331. In some instances, the channel gap is configured to have a thickness sufficient such that the heated glass sheet is cooled by conduction more than by convection. In some embodiments, the channel gap may have a thickness such that when glass sheet 400b is being conveyed through the channel, the distance between the glass sheet and the heat sink surface (the gap) is about 100 µm or greater (e.g., in the range from about 100 µm to about 200 µm, from about 100 µm to about 190 µm, from about 100 µm to about 180 µm, from about 100 µm to about 170 µm, from about 100 µm to about 160 µm, from about 100 µm to about 150 µm, from about 110 µm to about 200 µm, from about 120 µm to about 200 µm, from about 130 µm to about 200 µm, or from about 140 µm to about 200 µm). In some embodiments, the channel gap may have a thickness such that when glass sheet 400b is being conveyed through the channel, the distance between the glass sheet and the heat sink surface (the gap or gaps 336) is about 100 µm or less (e.g., in the range from about 10 µm to about 100 µm, from about 20 µm to about 100 µm, from about 30 µm to about 100 µm, from about 40 µm to about 100 µm, from about 10 µm to about 90 µm, from about 10 µm to about 80 µm, from about 10 µm to about 70 µm, from about 10 µm to about 60 µm, or from about 10 µm to about 50 µm). The total thickness of the channel gap 330a is dependent on the thickness of the glass sheet 400b but can be generally characterized as 2 times the distance between the heat sink surface and the glass sheet plus the thickness of the glass sheet. In some embodiments, the distance or gaps 336 between the glass sheet and the heat sinks may not be equal. In such embodiments, the total thickness of the channel gap 330a may be characterized as the sum of the distances between the glass sheet and each heat sink surface and the thickness of the glass sheet.

In some instances, the total thickness of the channel gap may be less than about 2500 µm (e.g., in the range from about 120 µm to about 2500 µm, about 150 µm to about 2500 µm, about 200 µm to about 2500 µm, about 300 µm to about 2500 µm, about 400 µm to about 2500 µm, about 500 µm to about 2500 µm, about 600 µm to about 2500 µm, about 700 µm to about 2500 µm, about 800 µm to about 2500 µm, about 900 µm to about 2500 µm, about 1000 µm to about 2500 µm, about 120 µm to about 2250 µm, about 120 µm to about 2000 µm, about 120 µm to about 1800 µm, about 120 µm to about 1600 µm, about 120 µm to about 1500 µm, about 120 µm to about 1400 µm, about 120 µm to about 1300 µm, about 120 µm to about 1200 µm, or about 120 µm to about 1000 µm). In some instances, the total thickness of the channel gap may be about 2500 µm or more (e.g., in the range from about 2500 µm to about 10,000 µm, about 2500 µm to about 9,000 µm, about 2500 µm to about 8,000 µm, about 2500 µm to about 7,000 µm, about 2500 µm to about 6,000 µm, about 2500 µm to about 5,000 µm, about 2500 µm to about 4,000 µm, about 2750 µm to about 10,000 µm, about 3000 µm to about 10,000 µm, about 3500 µm to about 10,000 µm, about 4000 µm to about 10,000 µm, about 4500 µm to about 10,000 µm, or about 5000 µm to about 10,000 µm).

The apertures 331a in the heat sink 331 may be positioned to be perpendicular to the heat sink surface or may be positioned at an angle of 20 degrees or less (e.g., about 15 degrees or less, about 10 degrees or less or about 5 degrees or less) from perpendicular to the heat sink surface.

In some embodiments, the material behind the heat sink (cold bearing 332) surfaces can be any suitable material having high heat transfer rates, including metals e.g. stainless steel, copper, aluminum), ceramics, carbon, etc.). This material may be relatively thick compared to the material behind the surfaces of the transition bearings 320, as shown in the figure, such that heat sink can easily accept relatively large amounts of thermal energy. FIG. 17A is a cut-away perspective cross section of an apparatus similar to that of FIG. 16, albeit reversed from right to left, and comprising additionally a load/unload zone 340 next to the cold zone 330 of the apparatus 300, including a load/unload gas bearing 342 with a glass sheet 400c positioned thereon. Also, the apparatus of FIG. 17A uses tight channel gaps (not indicated on the figure) in all of the hot, transition bearing, and cold zones 310, 320, and 330, respectively.

The inset in FIG. 17A shows an alternative embodiment of a cold zone gas bearing 332a, in which the gas bearing 322a is actively cooled by coolant channels 334 between gas bearing feed holes 333, where the feed holes feed the apertures in the surface of the bearing 322a. The cooling channels 334 are defined between heat sink segments 333b which are assembled together to form the heat sink 332a and the surface thereof facing the glass sheet 400b. The cooling channels 334 may be positioned very near the surface of the heat sink 331 in the solid material of the gas bearing 332, with a region of solid bearing material between the heat sink/gas bearing surface and the nearest-the-surface edge of the coolant channel 334 having the same width as the nearest-the-surface edge of the coolant channel 334. Accordingly, in some embodiments there is no region of reduced cross section in the solid material of the heat sink 331/gas bearing 332a between a coolant channel 334 and the surface facing the glass 400b. This differs from the typical convective gas cooling equipment, because the high gas flow rates mandate that significant space be provided in the middle of the array of gas nozzles for the gas flows to escape. Where active cooling is used, typically it is necessary to have a region of reduced cross section in the solid material of the gas nozzle design, relative to the solid material nearest the glass surface. The reduced cross section region is generally positioned between the active cooling fluid and glass sheet under treatment, in order to give a high-volume path for the large volume of heated gas returning from the sheet.

Figure 17B:
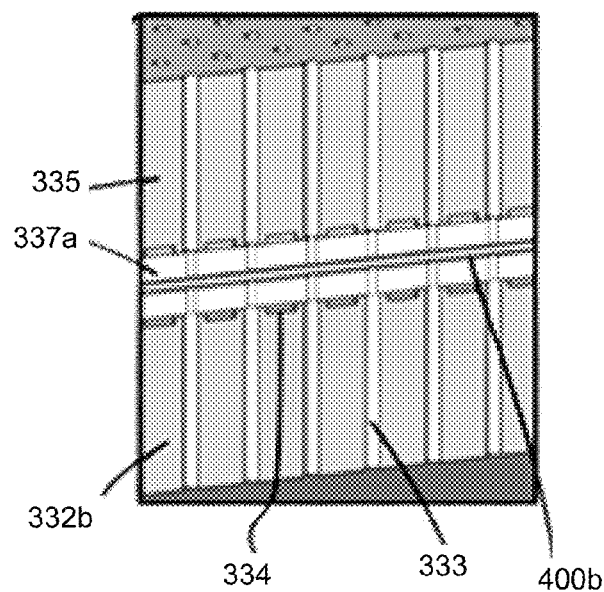
FIG. 17B is a perspective cut-away view of an alternative embodiment of the inset feature of FIG. 17A
Figure 17C:
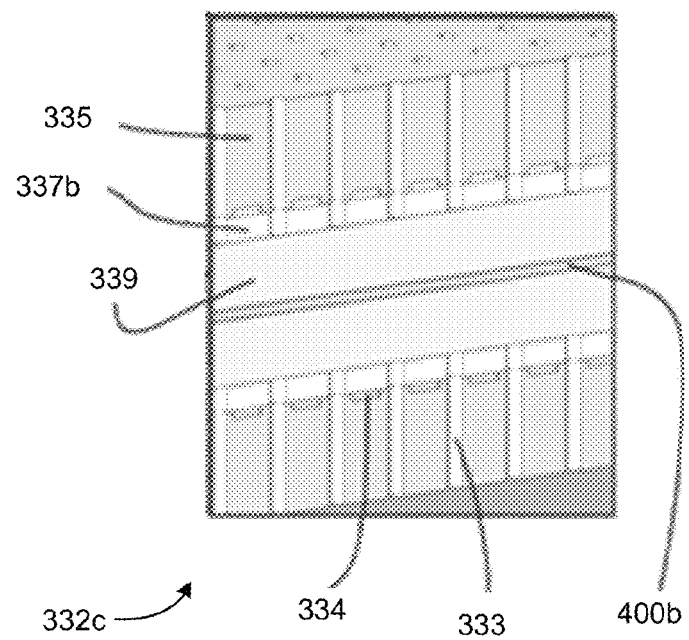
FIG. 17C is a perspective cut-away view of yet another alternative embodiment of the inset feature of FIG. 17A.

FIG. 17B shows yet another alternative embodiment of a cold zone gas bearing 332b like that of the inset of FIG. 17A. In this embodiment, coolant channels 334 are formed between a gas bearing feed member 335, containing gas bearing feed holes 333, and a gas bearing face member 337a which provides the glass sheet 400b facing surface of the gas bearing 332b. FIG. 17C shows yet another alternative cold zone gas bearing 332c, similar structure to the embodiment of FIG. 17B, but having a porous member 339 between a bearing plate member 337b, which porous member 339 forms the surface facing the glass sheet 400b.

The processes and apparatuses described herein may generally be used with almost any glass composition, and some embodiments can be used with glass laminates, glass ceramics, and/or ceramics. In embodiments, the processes can be used with glass compositions having high CTEs. In embodiments, glasses used include alkali aluminosilicates, such as Corning's® Gorilla® Glasses, SLG, soda- or alkali-free glasses and the like. In some embodiments, the glasses used have CTEs of greater than about $40 \times 10^{-7}/°$ C., greater than about $50 \times 10^{-7}/°$ C., greater than about $60 \times 10^{-7}/°$ C., greater than about $70 \times 10^{-7}/°$ C., greater than about $80 \times 10^{-7}/°$ C., or greater than about $90 \times 10^{-7}/°$ C.

The processes and apparatuses described herein may generally be used with glasses of any thickness. In some embodiments glass sheets of 3 mm or less in thickness are used. In some embodiments, the glass thickness is about 8 mm or less, about 6 mm or less, about 3 mm or less, about 2.5 min or less, about 2 mm or less about 1.8 mm or less, about 1.6 mm or less, about 1.4 min or less, about 1.2 mm or less, about 1 mm or less, about 0.8 mm or less, about 0.7 mm or less, about 0.6 mm or less, about 0.5 mm or less, about 0.4 mm or less, about 0.3 mm or less, or about 0.28 or less. In some embodiments, the glass is a flexible glass sheet. In other embodiments, the glass is comprises a laminate of two or more glass sheets.

Compressive stresses of glasses resulting from the processes disclosed herein vary as a function of thickness of the glasses. In some embodiments, glasses having a thickness of 3 mm or less have a compressive stress of at least 80 MPa, such as at least 100 MPa, such as at least 150 MPa, such as at least 200 MPa, such as at least 250 MPa, such as at least 300 MPa, such as at least 350 MPa, such as at least 400 MPa, and/or no more than 1 GPa. In contemplated embodiments, glasses having a thickness of 2 mm or less have a compressive stress of at least 80 MPa, such as at least 100 MPa, such as at least 150 MPa, such as at least 175 MPa, such as at least 200 MPa, such as at least 250 MPa, such as at least 300 MPa, such as at least 350 MPa, such as at least 400 MPa, and/or no more than 1 GPa. In contemplated embodiments, glasses having a thickness of 1.5 mm or less have a compressive stress of at least 80 MPa, such as at least 100 MPa, such as at least 150 MPa, such as at least 175 MPa, such as at least 200 MPa, such as at least 250 MPa, such as at least 300 MPa, such as at least 350 MPa, and/or no more than 1 GPa. In contemplated embodiments, glasses having a thickness of 1 mm or less have a compressive stress of at least 80 MPa, such as at least 100 MPa, at least 150 MPa, such as at least 175 MPa, such as at least 200 MPa, such as at least 250 MPa, such as at least 300 MPa, and/or no more than 1 GPa. In contemplated embodiments, glasses having a thickness of 0.5 mm or less have a compressive stress of at least 50 MPa, such as at least 80 MPa, such as at least 100 MPa, such as at least 150 MPa, such as at least 175 MPa, such as at least 200 MPa, such as at least 250 MPa, and/or no more than 1 GPa.

Glasses sheets having undergone the processes described herein may be further processed by undergoing ion exchange to further enhance their strength. Ion-exchanging glasses heat strengthened as described herein may increase the above-described compressive stresses by at least 20 MPa, such as at least 50 MPa, such as at least 70 MPa, such as at least 80 MPa, such as at least 100 MPa, such as at least 150 MPa, such as at least 200 MPa, such as at least 300 MPa, such as at least 400 MPa, such as at least 500 MPa, such as at least 600 MPa and/or no more than 1 GPa, in some such contemplated embodiments.

Figure 18:
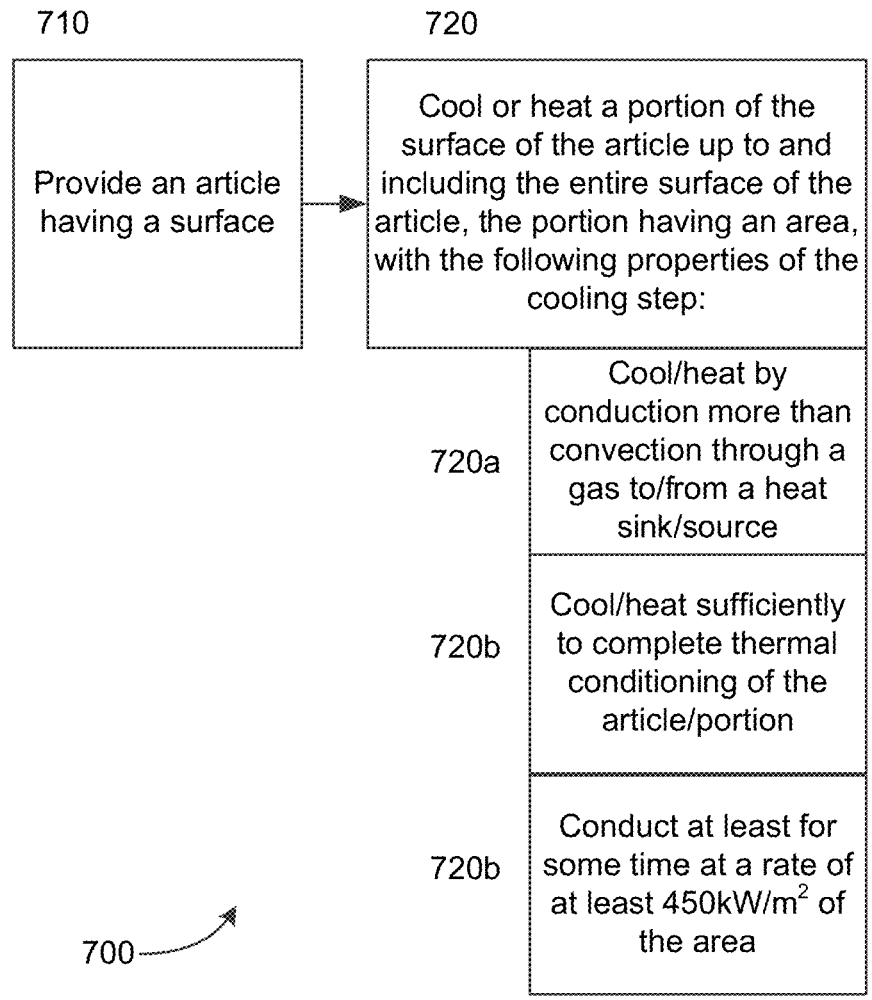
FIG. 18 is a flow chart illustrating some aspects of yet another method according to the present disclosure.

In addition to thermally tempering thin glass sheets, the processes and apparatuses described herein can be used for additional processes as well. While cooling is specifically called out, the apparatuses and processes could be used equally well to transfer heat into the glass sheet via a conductive method. Such a process or method is illustrated in the flow chart of FIG. 18. The method 700 there shown includes two main steps. The first step, step 710 involves simply providing an article having a surface. The second step, step 720 involves heating or cooling a portion of the surface of the article up to and including the entire surface of the article. Step 720 is performed by conduction more than by convection through a gas from or to a heat source or a heat sink source as shown in sub-part 720a, and is performed sufficiently to complete thermal conditioning of the article or the portion of the surface of the article in sub-part 720b, and the conduction of the cooling/heating of step 720 is performed at a high rate of heat transfer, at least 450 kW/m² of the area of the portion in sub-part 720b.

For example, an article can be thermally conditioned—i.e., either heated or cooled—by cooling or heating a portion a portion of the surface of the article up to and including the entire surface of the article, the portion having an area, by conduction more than by convection, the conduction mediated through a gas to or from a heat sink or a heat source and not through solid to solid contact, sufficiently to complete a thermal conditioning of the article or of the portion of the surface of the article, and the conduction being performed, during at least some time of the heating or cooling, at a rate of at least 450, 550, 650, 750, 800, 900, 1000, 1100, or 1200, 1500, 2000, 3000, 4000 or even 5000 or more kW per square meter.

In addition to tempering, the high rates of thermal power transfer make it possible to for thermal processing of all kinds, including heating and cooling during tempering, edge strengthening of glass, firing or sintering of ceramics, glasses, or other materials, and so forth. Additionally, since the heat is extracted or delivered primarily by conduction, tight control is provided over the thermal history and the heat distribution in the treated article while preserving surface smoothness and quality. Accordingly, it will be possible to use the apparatuses and methods of the present disclosure to intentionally vary the stress profile from the strengthening process, both in the thickness direction and in the directions in which the plane of the sheet lies, by varying gaps, varying heat sink/source materials, varying heat sink/source temperatures, varying the gas mixture.

EXAMPLES

Apparatus setup—As detailed above, the apparatus comprises three zones—a hot zone, a transition zone, and a quench zone. The gaps between the top and bottom thermal bearings (heat sinks) in the hot zone and the quench zone are set to the desired spacings. Gas flow rates in the hot zone, transition zone, and quench zone are set to ensure centering of the part on the air-bearing. The hot zone is pre-heated to the desired $T_0$, the temperature from which the glass article will be subsequently quenched. To ensure uniform heating, glass articles are pre-heated in a separate pre-heating apparatus, such as a batch or continuous furnace. Generally, glass sheets are pre-heated for greater than 5 minutes prior to loading in the hot zone. For soda lime glasses, pre-heating is done around 450° C. After the pre-heat phase, the glass article is loaded into the hot zone and allowed to equilibrate, where equilibration is where the glass is uniformly at $T_0$. $T_0$ can be determined by the tempering desired, but is generally kept in the range between the softening point and the glass transition temperature. The time to equilibration is dependent at least on the thickness of the glass. For example, for glass sheets of approximately 1.1 mm or less, equilibration occurs in approximately 10 seconds. For 3 mm glass sheets, equilibration occurs in approximately 10 seconds 30 seconds. For thicker sheets, up to approximately 6 mm, the equilibration time may be on the order of 60 seconds (for articles approximately 6 mm thick). Once the glass has equilibrated to T0, it is rapidly transferred through the transition zone on air bearings and into the quench zone. The glass article rapidly quenches in the quench zone to a temperature below the glass transition temperature, Tg. The glass sheet can be maintained in the quench zone for any period of time from 1 second, 10 seconds, or to several minutes or more, depending on the degree of quench desired and/or the desired temperature of the glass at removal. Upon removal the glass is optionally be allowed to cool before handling.

The following examples are summarized in Table V.

Example 1

A soda-lime silicate glass plate of 5.7 mm thickness is pre-heated for 10 minutes at 450° C. before transferring to the hot zone where it is held at a $T_0$ of 690° C. for 60 seconds. After equilibrating to $T_0$, it is rapidly transferred to the quench zone, which has a gap of 91 μm (wherein the gap is the distance between the surface of the glass sheet and the nearest heat sink), where it is held for 10 seconds. The resulting article has a surface compression of −312 MPa, a central tension of 127 MPa, and a flatness of 83 μm.

Example 2

A soda-lime silicate glass plate of 5.7 mm thickness is pre-heated for 10 minutes at 450° C. before transferring to the hot zone where it is held at a $T_0$ of 690° C. for 60 seconds. After equilibrating it is rapidly transferred to the quench zone, which has a gap of 91 μm, where it is held for 10 seconds. The resulting article has a surface compression of −317 MPa, a central tension of 133 MPa, and a flatness of 90 μm.

Example 3

A soda-lime silicate glass plate of 1.1 mm thickness is pre-heated for 10 minutes at 450° C. before transferring to the hot zone where it is held at a $T_0$ of 700° C. for 10 seconds. After equilibrating it is rapidly transferred to the quench zone, which has a gap of 56 μm, where it is held for 10 seconds. The resulting article has a surface fictive temperature measured to be 661° C., a surface compression of −176 MPa, a central tension of 89 MPa, a flatness of 190 μm, and a Vicker's cracking threshold of 10-20 N.

Example 4

A soda-lime silicate glass plate of 0.55 mm thickness is pre-heated for 10 minutes at 450° C. before transferring to the hot zone where it is held at a $T_0$ of 720° C. for 10 seconds. After equilibrating it is rapidly transferred to the quench zone, which has a gap of 25 μm, where it is held for 10 seconds, resulting in an effective heat transfer rate of 0.184 cal/(cm$^2$-s-° C.). The resulting article has a surface compression of −176 MPa, a central tension of 63 MPa, and a flatness of 125 μm.

Example 5

A CORNING® GORILLA® Glass plate of 1.5 mm thickness is pre-heated for 10 minutes at 550° C. before transferring to the hot zone where it is held at a $T_0$ of 790° C. for 30 seconds. After equilibrating it is rapidly transferred to the quench zone, which has a gap of 226 μm, where it is held for 10 seconds. The glass article has an improvement in flatness measured to be 113 μm pre-processing and 58 μm post-processing.

Example 6

A soda-lime silicate glass plate of 0.7 mm thickness is pre-heated for 10 minutes at 450° C. before transferring to the hot zone where it is held at a $T_0$ of 730° C. for 10 seconds. After equilibrating it is rapidly transferred to the quench zone, which has a gap of 31 μm, where it is held for 10 seconds, resulting in an effective heat transfer rate of 0.149 cal/(cm$^2$-s-° C.). The resulting article has a surface compression of −206 MPa, a central tension of 100 MPa, and a flatness of 82 μm. Upon fracture, the glass sheet is observed to "dice" (using standard terminology for 2 mm thickness or greater sheet dicing—i.e., a 5×5 cm square of glass sheet breaks into 40 or more pieces) suggesting that the sheet is fully tempered.

Example 7

A Borofloat-33 glass plate of 3.3 mm thickness is pre-heated for 10 minutes at 550° C. before transferring to the hot zone where it is held at a $T_0$ of 800° C. for 30 seconds. After equilibrating it is rapidly transferred to the quench zone, which has a gap of 119 μm, where it is held for 10 seconds. The resulting article has a flatness of 120 μm. Upon fracture of the part it is observed to "dice" (using standard terminology for 2 mm or greater thickness sheet dicing—i.e., a 5×5 cm square of glass sheet breaks into 40 or more pieces) showing that the sheet is fully tempered.

Example 8

A soda-lime silicate glass plate of 3.2 mm thickness is pre-heated for 10 minutes at 450° C. before transferring to the hot zone where it is held at a $T_0$ of 690° C. for 30 seconds. After equilibrating it is rapidly transferred to the quench zone, which has a gap of 84 μm, where it is held for 10 seconds. The resulting article has a surface compression of −218 MPa, a central tension of 105 MPa, and a flatness of 84 μm.

Example 9

A soda-lime silicate glass plate of 0.3 mm thickness is pre-heated for 10 minutes at 450° C. before transferring to the hot zone where it is held at a $T_0$ of 630° C. for 10 seconds. After equilibrating it is rapidly transferred to the quench zone, which has a gap of 159 μm, where it is held for 10 seconds. The resulting article has membrane stresses which are observable by gray field polarimetry, suggesting the glass has incorporated the thermal stress.

Example 10

A CORNING® GORILLA® Glass plate of 0.1 mm thickness is pre-heated for 10 minutes at 550° C. before transferring to the hot zone where it is held at a $T_0$ of 820° C. for 10 seconds. After equilibrating it is rapidly transferred to the quench zone, which has a gap of 141 μm, where it is held for 10 seconds, resulting in an effective heat transfer rate of 0.033 cal/(cm$^2$-s-° C.). Upon fracture, the resulting article displays behavior consistent with a residually stressed glass.

Example 11

A soda-lime silicate glass plate of 1.1 mm thickness is pre-heated for 10 minutes at 450° C. before transferring to the hot zone where it is held at a $T_0$ of 700° C. for 10 seconds. After equilibrating it is rapidly transferred to the quench zone, which has a gap of 65 µm, where it is held for 10 seconds, resulting in an effective heat transfer rate of 0.07 cal/(cm$^2$-s-° C.). The resulting article has a surface fictive temperature measured to be 657° C., a surface compression of −201 MPa, a central tension of 98 MPa, a flatness of 158 µm, and a Vicker's cracking threshold of 10-20 N.

Example 12

A CORNING® GORILLA® Glass plate of 1.1 mm thickness is pre-heated for 10 minutes at 550° C. before transferring to the hot zone where it is held at a $T_0$ of 810° C. for 10 seconds. After equilibrating it is rapidly transferred to the quench zone which has a gap of 86 µm, where it is held for 10 seconds, resulting in an effective heat transfer rate of 0.058 cal/(cm$^2$-s-° C.). The resulting article has a surface fictive temperature measured to be 711° C., a surface compression of −201 MPa, a central tension of 67 MPa, and a Vicker's cracking threshold of 20-30 N.

Example 13

A CORNING® GORILLA® Glass plate of 1.1 mm thickness is pre-heated for 10 minutes at 550° C. before transferring to the hot zone where it is held at a $T_0$ of 800° C. for 10 seconds. After equilibrating it is rapidly transferred to the quench zone, which has a gap of 91 µm, where it is held for 10 seconds. The resulting article has a surface fictive temperature measured to be 747° C., a surface compression of −138 MPa, a central tension of 53 MPa, a flatness of 66 µm, and a Vicker's cracking threshold of 20-30 N.

TABLE V

| Example | Thickness (mm) | Composition | Gaps (um) | $T_0$ | Gas | CS (MPa) | CT (MPa) | Flatmaster (um) | Fictive (° C.) | Vickers (N) |
|---|---|---|---|---|---|---|---|---|---|---|
| 1 | 5.7 | SLG | 91 | 690 | Helium | −312 | 127 | 83 | — | — |
| 2 | 5.7 | SLG | 91 | 690 | Helium | −317 | 133 | 90 | — | — |
| 3 | 1.1 | SLG | 56 | 700 | Helium | −176 | 89 | 190 | 661.3 | 10-20 |
| 4 | 0.55 | SLG | 25 | 720 | Helium | −176 | 63 | 125 | — | — |
| 5 | 1.5 | GG | 226 | 790 | Helium | — | — | 113 before/ 58 after | — | — |
| 6 | 0.7 | SLG | 31 | 730 | Helium | −206 | 100 | 82 | — | — |
| 7 | 3.3 | Borofloat 33 | 119 | 800 | Helium | — | — | 121 | — | — |
| 8 | 3.2 | SLG | 84 | 690 | Helium | −218 | 105 | 81 | — | — |
| 9 | 0.3 | SLG | 159 | 630 | Helium | — | — | — | — | — |
| 10 | 0.1 | GG | 141 | 820 | Helium | — | — | — | — | — |
| 11 | 1.1 | SLG | 65 | 700 | Helium | −201 | 98 | 158 | 657 | 10-20 |
| 12 | 1.1 | GG | 86 | 810 | Helium | −201 | 67 | — | 711 | 20-30 |
| 13 | 1.1 | GG | 91 | 800 | Helium | −138 | 53 | 66 | 747 | 20-30 |

Other aspects and advantages will be apparent from a review of the specification as a whole and the appended claims.

U.S. application Ser. No. 14/814,181 filed Jul. 30, 2015 is incorporated by reference herein in its entirety.

What is claimed is:

1. Process for strengthening a sheet, the process comprising:

cooling a sheet comprising a material, the sheet having first and second sheet surfaces, the material having a transition temperature, the sheet being at a temperature greater than the transition temperature at the start of the cooling, wherein the cooling is performed:

a. positioning the first sheet surface adjacent to a first heat sink surface with a first gap between the first sheet surface and the first heat sink surface such that thermal conduction from the first sheet surface to the first heat sink surface occurs, the first gap having a length across the first gap of $g_1$ and an area of the first gap of $A_{g1}$, b. positioning the second sheet surface adjacent to a second heat sink surface with a second gap between the second sheet surface and the second heat sink surface such that thermal conduction from the second sheet surface to the second heat sink surface occurs, the second gap having a length across the second gap of $g_2$ and an area of the second gap of $A_{g2}$, c. providing a first flow of a first gas to the first gap and providing a second flow of a second gas to the second gap, the first gas having a heat capacity $C_{p1}$ and a thermal conductivity $k_1$, the second gas having a heat capacity $C_{p2}$ and a thermal conductivity $k_2$, the flow provided at a mass flow rate $\dot{m}_1$ of the first gas, wherein $\dot{m}_1$ is greater than zero and less than $(2k_1 A_{g1})/(g_1 C_{p1})$, to the first gap, and at a mass flow rate $\dot{m}_2$ of the second gas, wherein $\dot{m}_2$ is greater than zero and less than $(2k_2 A_{g2})/(g_2 C_{p2})$, to the second gap, whereby the first and second flows contact the sheet, and the sheet is cooled, by conduction more than by convection, d. sufficiently to cool the sheet to a temperature below the transition temperature.

2. The process according to claim 1, wherein the first heat sink surface has multiple first apertures and the second heat sink has multiple second apertures, and wherein providing a first flow of a first gas to the first gap comprises flowing the first gas to the first gap only through the multiple first apertures and wherein providing a second flow of a second gas to the second gap consists of flowing the second gas to the second gap only through the multiple second apertures.

3. Process according to claim 2, wherein the first and second gaps are about 100 µm or less.

4. Process according to claim 3, wherein the first gas is air.

5. Process according to claim 3, wherein the first gas is helium.

6. Process according to claim 2, wherein the multiple first and second apertures have a cross-sectional dimension of less than 0.5 mm.

7. Process according to claim 6, wherein the multiple apertures in the first and second heat sink surfaces are within 20 degrees of perpendicular to the respective first and second heat sink surfaces.

8. Process according to claim 2, wherein the multiple first and second apertures have a cross-sectional dimension of less than 0.01 mm.

9. Process according to claim 1, further comprising the step of heating the sheet principally by conduction through a gas from a heat source, the step of heating the sheet principally by conduction being performed prior to the step of cooling the sheet.

10. A process according claim 1, further comprising imparting a surface fictive temperature of the first surface of the sheet, as measured by Raman shift, of at least 50° C. relative to a glass transition temperature of the sheet.

11. Process for strengthening a sheet, the process comprising:
    a. supporting at least a portion of a sheet on a first surface thereof, at least in part, by a flow or a pressure of a gas delivered to a gap between the first surface and a first heat sink, wherein the sheet comprises a glass having a transition temperature and the sheet is at a temperature greater than the transition temperature of the glass;
    b. cooling the sheet, by thermal conduction more than by convection, from the first surface of the sheet through the gas to the first heat sink, to a temperature below the transition temperature.

12. Process for strengthening a sheet, the process comprising:
    Heating a sheet comprising a material having first and second sheet surfaces, the material having a transition temperature, the heating performed sufficiently to bring the sheet above the transition temperature;
    positioning the first sheet surface adjacent to a first heat sink surface across a first gap, the first heat sink surface having first multiple apertures;
    positioning the second sheet surface adjacent to a second heat sink surface across a second gap, the second heat sink surface having second multiple apertures;
    delivering a gas into the first and second gaps through the first and second multiple apertures and cooling the sheet by conduction more than by convection, and to a temperature below the transition temperature.

* * * * *